US010602138B2

United States Patent
Son et al.

(10) Patent No.: US 10,602,138 B2
(45) Date of Patent: Mar. 24, 2020

(54) METHOD AND DEVICE FOR CHROMA SAMPLE INTRA PREDICTION IN VIDEO CODING SYSTEM

(71) Applicant: LG ELECTRONICS INC., Seoul (KR)

(72) Inventors: Eunyong Son, Seoul (KR); Jin Heo, Seoul (KR); Seungwook Park, Seoul (KR); Yongjoon Jeon, Seoul (KR); Moonmo Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 15/755,037

(22) PCT Filed: Aug. 25, 2016

(86) PCT No.: PCT/KR2016/009411
§ 371 (c)(1),
(2) Date: Feb. 23, 2018

(87) PCT Pub. No.: WO2017/034331
PCT Pub. Date: Mar. 2, 2017

(65) Prior Publication Data
US 2018/0241995 A1 Aug. 23, 2018

Related U.S. Application Data

(60) Provisional application No. 62/210,955, filed on Aug. 27, 2015.

(51) Int. Cl.
*H04N 19/11* (2014.01)
*H04N 19/186* (2014.01)
(Continued)

(52) U.S. Cl.
CPC .......... *H04N 19/11* (2014.11); *H04N 19/159* (2014.11); *H04N 19/176* (2014.11); *H04N 19/186* (2014.11); *H04N 19/593* (2014.11)

(58) Field of Classification Search
CPC .... H04N 19/11; H04N 19/159; H04N 19/176; H04N 19/186; H04N 19/1593
See application file for complete search history.

(56) References Cited

U.S. PATENT DOCUMENTS

2013/0101036 A1   4/2013   Zhou
2014/0126635 A1   5/2014   Zheludkov et al.
(Continued)

FOREIGN PATENT DOCUMENTS

JP   2015-53728 A   3/2015
KR   10-2013-0050900 A   5/2013

OTHER PUBLICATIONS

NPL: Intra Coding of the HEVC Standard (IEEE Transactions on Circuits and Systems for Video Technology, vol. 22, No. 12, Dec. 2012), provided with IDS dated on Feb. 23, 2018.*

(Continued)

*Primary Examiner* — Zaihan Jiang
*Assistant Examiner* — Susan X Li
(74) *Attorney, Agent, or Firm* — Dentons US LLP

(57) ABSTRACT

An intra prediction method according to the present invention comprises the steps of: acquiring information on a luma prediction mode of a current block and information on a chroma prediction mode of the current block from a bit stream; deriving a luma intra prediction mode of the current block on the basis of the information on the luma prediction mode; determining a chroma intra prediction mode of the current block on the basis of information on the luma intra prediction mode and the information on the chroma prediction mode; and generating a chroma prediction sample of the (Continued)

current block on the basis of the chroma intra prediction mode. According to the present invention, it is possible to reflect the difference between the ratio of the width to the height of a luma component and the ratio of the width to the height of a chroma component, and thus to more accurately perform intra prediction in units of samples and improve intra prediction performance.

9 Claims, 9 Drawing Sheets

(51) Int. Cl.
*H04N 19/159* (2014.01)
*H04N 19/176* (2014.01)
*H04N 19/593* (2014.01)

(56) References Cited

U.S. PATENT DOCUMENTS

2015/0281687 A1* 10/2015 Yasugi ................ H04N 19/159
                                                                382/166
2016/0373782 A1* 12/2016 Zhao ................... H04N 19/176

OTHER PUBLICATIONS

Jani Lainema et al., "Intra Coding of the HEVC Standard", IEEE Transactions on Circuits and Systems for Video Technology, vol. 22, No. 12, Dec. 2012, pp. 1792-1801.

* cited by examiner

METHOD AND DEVICE FOR CHROMA SAMPLE INTRA PREDICTION IN VIDEO CODING SYSTEM

CROSS-REFERENCE TO RELATED APPLICATIONS

This application is the National Stage filing under 35 U.S.C. 371 of International Application No. PCT/KR2016/009411, filed on Aug. 25, 2016, which claims the benefit of U.S. Provisional Application No. 62/210,955 filed on Aug. 27, 2015, the contents of which are all hereby incorporated by reference herein in their entirety.

BACKGROUND OF THE INVENTION

Field of the Invention

The present invention relates to a video coding technique, and more specifically, to a chroma sample intra-prediction method and device in a video coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

An object of the present invention is to provide a method and device for improving intra-prediction efficiency.

Another object of the present invention is to provide a method and device for deriving a chroma intra-prediction mode.

Yet another object of the present invention is to provide a method and device for efficiently deriving a chroma intra-prediction mode on the basis of a luma intra-prediction mode.

Still another object of the present invention is to provide a method and device for deriving a chroma intra-prediction mode of an input image in YUV 4:2:2 color format.

According to an embodiment of the present invention, an intra-prediction method performed by a decoding device is provided. The intra-prediction method includes: acquiring information on a luma prediction mode of a current block and information on a chroma prediction mode of the current block from a bitstream; deriving a luma intra-prediction mode of the current block on the basis of the information on the luma prediction mode; determining a chroma intra-prediction mode of the current block on the basis of the luma intra-prediction mode and the information on the chroma prediction mode; and generating a chroma prediction sample of the current block on the basis of the chroma intra-prediction mode, wherein a value of the information on the chroma prediction mode indicates 4, the luma intra-prediction mode is one of predefined intra-prediction modes #0 to #34, and the chroma intra-prediction mode is determined as an intra-prediction mode having a higher number than the luma intra-prediction mode when the luma intra-prediction mode is one of intra-prediction modes #18 to #25 and determined as an intra-prediction mode having a lower number than the luma intra-prediction mode when the luma intra-prediction mode is one of intra-prediction modes #27 to #34.

According to another embodiment of the present invention, an intra-prediction method performed by a decoding device is provided. The intra-prediction method includes: acquiring information on a luma prediction mode of a current block and information on a chroma prediction mode of the current block from a bitstream; deriving a luma intra-prediction mode of the current block on the basis of the information on the luma prediction mode; determining a chroma intra-prediction mode of the current block on the basis of the luma intra-prediction mode and the information on the chroma prediction mode; and generating a chroma prediction sample of the current block on the basis of the chroma intra-prediction mode, wherein a value of the information on the chroma prediction mode indicates 4, the luma intra-prediction mode is one of predefined intra-prediction modes #0 to #66, and the chroma intra-prediction mode is determined as an intra-prediction mode having a higher number than the luma intra-prediction mode when the luma intra-prediction mode is one of intra-prediction modes #34 to #49 and determined as an intra-prediction mode having a lower number than the luma intra-prediction mode when the luma intra-prediction mode is one of intra-prediction modes #51 to #66.

According to an embodiment of the present invention, an intra-prediction method performed by an encoding device is provided. The intra-prediction method includes: deriving a luma intra-prediction mode of a current block; determining a chroma intra-prediction mode of the current block; generating information on the luma intra-prediction mode on the basis of the luma intra-prediction mode and generating information on the chroma intra-prediction mode on the basis of the luma intra-prediction mode and the chroma intra-prediction mode; generating a chroma prediction sample of the current block on the basis of the chroma intra-prediction mode; and encoding information on a prediction mode including the information on the luma intra-prediction mode and the information on the chroma intra-prediction mode and outputting the encoded information, wherein a value of the information on the chroma prediction mode indicates 4, the luma intra-prediction mode is one of predefined intra-prediction modes #0 to #34, and the chroma intra-prediction mode is indicated as an intra-prediction mode having a higher number than the luma intra-prediction mode when the luma intra-prediction mode is one of intra-prediction modes #18 to #25 and indicated as an intra-prediction mode having a lower number than the luma intra-prediction mode when the luma intra-prediction mode is one of intra-prediction modes #27 to #34.

According to another embodiment of the present invention, a decoding device which performs intra-prediction is provided. The decoding device includes: an entropy decoder configured to acquire information on a luma prediction mode of a current block and information on a chroma prediction mode of the current block from a bitstream; and a predictor configured: to derive a luma intra-prediction mode of the current block on the basis of the information on the luma prediction mode; to determine a chroma intra-prediction mode of the current block on the basis of the luma intra-prediction mode and the information on the chroma prediction mode; and to generate a chroma prediction sample of the current block on the basis of the chroma intra-prediction mode, wherein a value of the information on the chroma prediction mode indicates 4, the luma intra-prediction mode is one of predefined intra-prediction modes #0 to #34, and the chroma intra-prediction mode is determined as an intra-prediction mode having a higher number than the luma intra-prediction mode when the luma intra-prediction mode is one of intra-prediction modes #18 to #25 and determined as an intra-prediction mode having a lower number than the luma intra-prediction mode when the luma intra-prediction mode is one of intra-prediction modes #27 to #34.

According to another embodiment of the present invention, an encoding device which performs intra-prediction is provided. The encoding device includes: a predictor configured: to derive a luma intra-prediction mode of a current block; to determine a chroma intra-prediction mode of the current block; to generate information on the luma intra-prediction mode on the basis of the luma intra-prediction mode and to generate information on the chroma intra-prediction mode on the basis of the luma intra-prediction mode and the chroma intra-prediction mode; and to generate a chroma prediction sample of the current block on the basis of the chroma intra-prediction mode; and an entropy encoder configured to encode information on a prediction mode including the information on the luma intra-prediction mode and the information on the chroma intra-prediction mode and outputting the encoded information, wherein a value of the information on the chroma prediction mode indicates 4, the luma intra-prediction mode is one of predefined intra-prediction modes #0 to #34, and the chroma intra-prediction mode is indicated as an intra-prediction mode having a higher number than the luma intra-prediction mode when the luma intra-prediction mode is one of intra-prediction modes #18 to #25 and indicated as an intra-prediction mode having a lower number than the luma intra-prediction mode when the luma intra-prediction mode is one of intra-prediction modes #27 to #34.

According to the present invention, it is possible to determine a chroma intra-prediction mode suitable for intra-prediction of a current block of an input image including the input image, a luma component and a chroma component and thus to improve intra-prediction performance.

According to the present invention, it is possible to determine a chroma intra-prediction mode in which a ratio difference between a luma component and a chroma component of an input image has been reflected by converting a prediction mode and/or a prediction direction of a luma intra-prediction mode and thus to improve intra-prediction performance.

In addition, according to the present invention, it is possible to adaptively derive chroma prediction modes corresponding to various luma prediction modes and thus to improve prediction efficiency.

DESCRIPTION OF EXEMPLARY EMBODIMENTS

Figure 1:
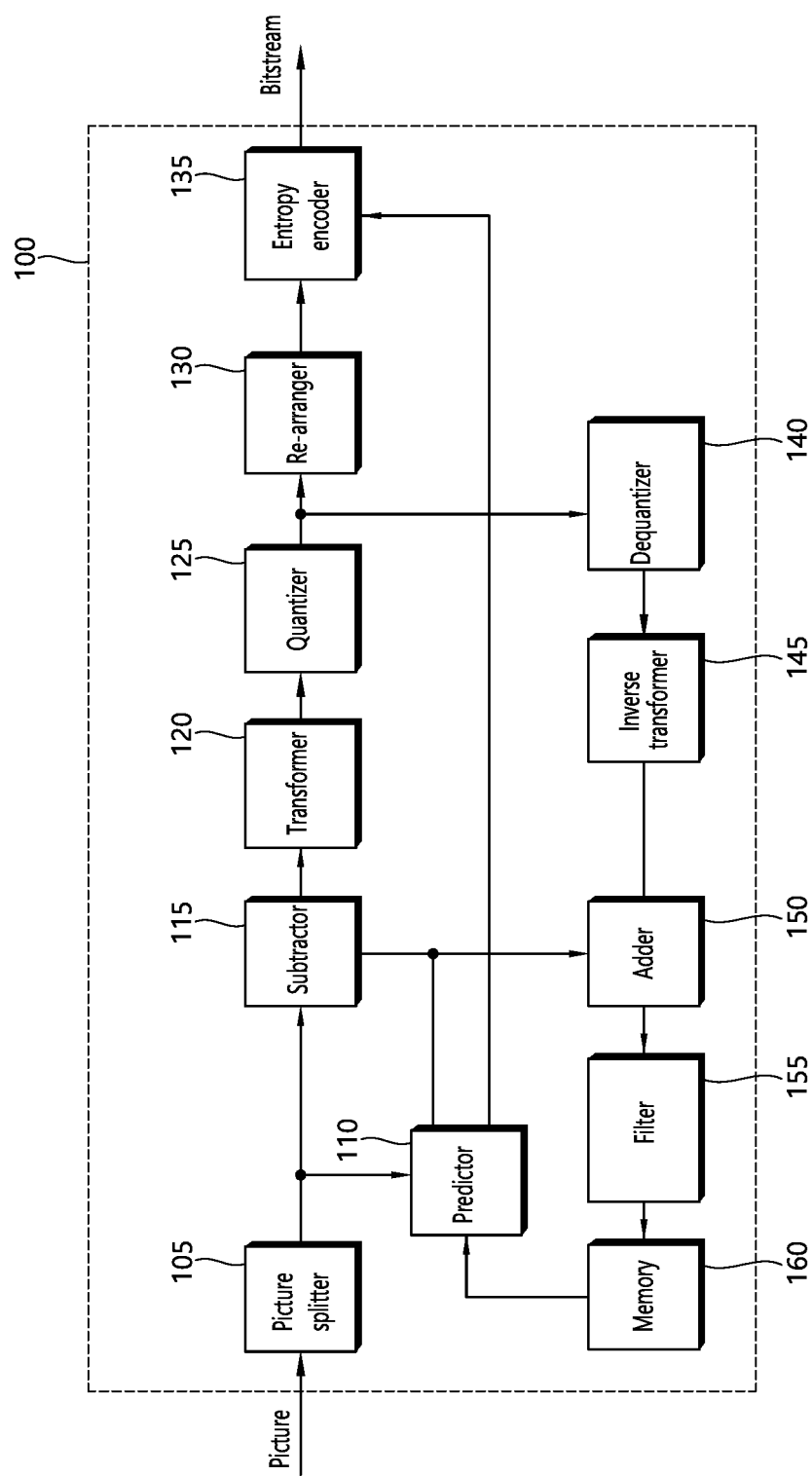
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pa may mean a minimum unit constituting one picture (or image). Further, a 'sample' may be used as a term corresponding to a pixel. The sample may generally represents a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture splitter 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture splitter 105 may split an input picture into at least one processing unit. Here, a processing unit may be a coding unit (CU), a prediction unit (PU) or a transform unit (TU). The coding unit is a unit block of coding and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may includes as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
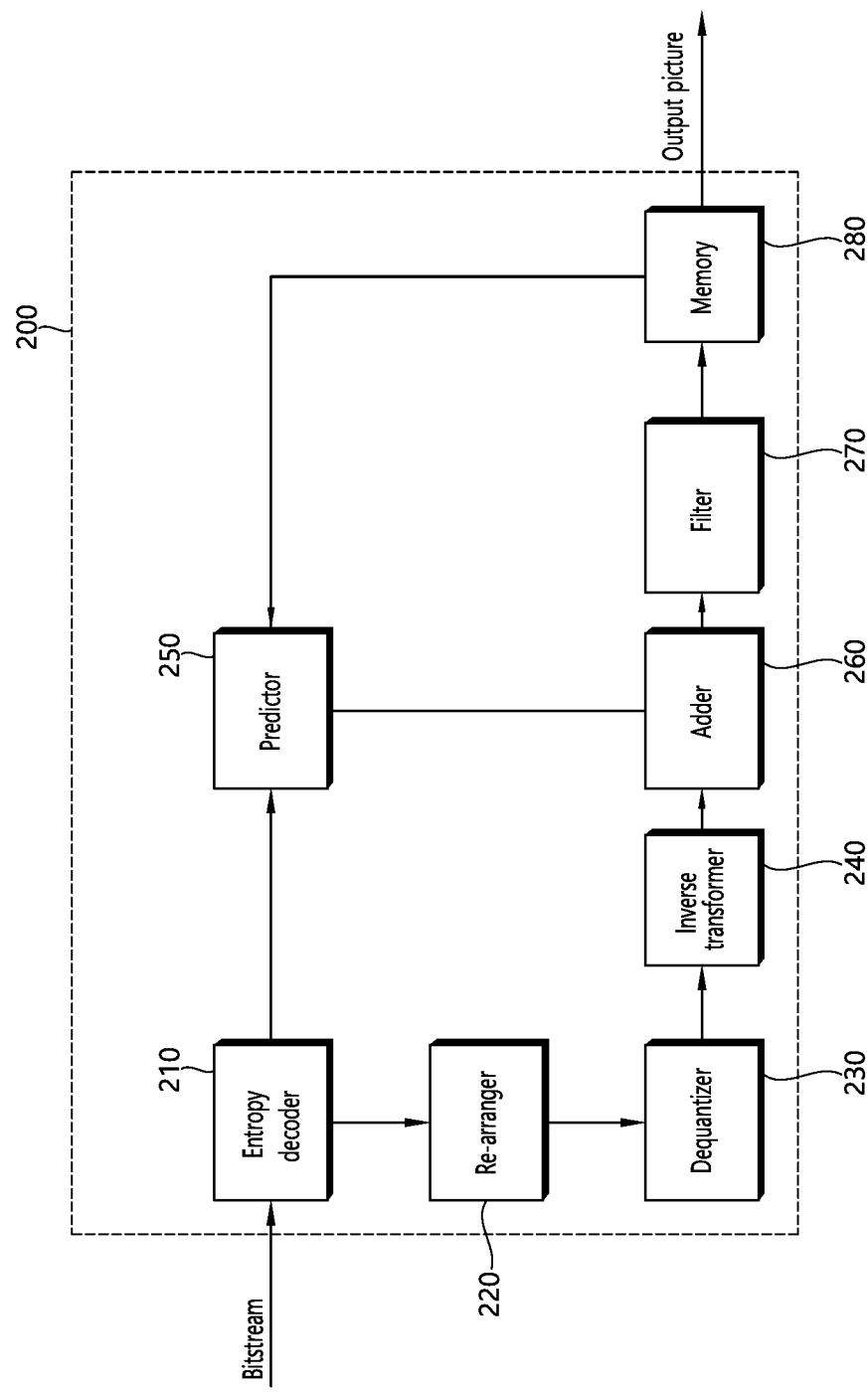
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients on the basis of a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

As described above, inter-prediction or intra-prediction can be performed in order to increase coding efficiency. Here, when intra-prediction is applied to the current block, the intra-prediction mode can include 35 prediction modes, in general.

TABLE 1

| Intra-prediction mode | Associated name |
| --- | --- |
| 0 | Intra-planar |
| 1 | Intra-DC |
| 2, . . . 34 | Intra-angular 2, . . . intra-angular 34 |

Here, 0 to 34 indicate indexes of the intra-prediction mode, intra-prediction mode #0 indicates an intra-planar mode and intra-prediction mode #1 indicates an intra-DC mode. Intra-prediction modes #2, . . . , #34 represent an intra-angular 2 mode, . . . , intra-angular 34 mode, respectively. The intra-planar mode and the intra-DC mode may be called intra-non-directional modes and the intra-angular 2 to intra-angular 34 modes may be called intra-directional modes.

In addition, the intra-prediction mode may include 67 prediction modes. For example, the 67 prediction modes can be used when prediction with higher performance is required. In this case, the 67 prediction modes can be configured as follows.

TABLE 2

| Intra-prediction mode | Associated name |
| --- | --- |
| 0 | Intra-planar |
| 1 | Intra-DC |
| 2, . . . 66 | Intra-angular 2, . . . intra-angular 66 |

In this case, intra-directional modes may include intra-angular 2 to intra-angular 66 modes as shown in the above table. Here, the intra-directional modes may have denser prediction directions and thus can improve prediction performance.

The encoding device may determine whether the intra-prediction mode includes the 67 prediction modes on the basis of rate distortion (RD) cost and transmit flag information indicating whether the intra-prediction mode includes the 67 prediction modes to the decoding device. Alternatively, whether the intra-prediction mode includes the 67 prediction modes may be predetermined on the basis of the size of the current block, a quantization parameter (QP) and the like.

Although the following description will be based on the 35 modes, it may be applied to the 67 modes.

When intra-prediction is performed, the decoding device derives an intra-prediction mode of a luma component first.

The decoding device may determine the intra-prediction mode of the luma component according to whether a most probable mode (MPM) or a remaining mode is applied. Here, the intra-prediction mode may be one of the DC mode, the planar mode and the angular modes. The Ingra prediction mode of the luma component may be called a luma intra-prediction mode.

When the MPM is applied, an MPM list may be determined on the basis of an intra-prediction mode with respect to a left or top neighboring block of the current block, and the intra-prediction mode may be determined on the basis of the MPM list. In this case, when the left or top neighboring block is not available (e.g., when the left or top neighboring block is located outside of a picture) or the left or top neighboring block has been coded in the inter-prediction mode, for example, the intra-prediction mode with respect to the left or top neighboring block may be set to the DC mode. When the remaining mode is applied, information indicating a specific intra-prediction mode among prediction modes that are not included in the MPM list may be signaled.

The decoding device may derive an intra-prediction mode of a chroma component on the basis of the determined luma intra-prediction mode and received information about a chroma intra-prediction mode. Here, the intra-prediction mode of the chroma component may be called a chroma intra-prediction mode and derived as shown in the following table.

TABLE 3

| | IntraPredModeY[xPb][yPb] | | | | |
|---|---|---|---|---|---|
| intra_chroma_pred_mode[xPb][yPb] | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

Here, IntraPredModeY[xPb][yPb] indicates the luma intra-prediction mode and intra_chroma_pred_mode[xPb][yPb] indicates information about the chroma intra-prediction mode. The information about the chroma intra-prediction mode may indicate a value in the range of 0 to 4. The chroma intra-prediction mode can be derived on the basis of the value indicated by the information about the chroma intra-prediction mode and the luma intra-prediction mode. For example, when the information about the chroma intra-prediction mode indicates 0 and the luma intra-prediction mode is not intra-prediction mode #0, the chroma intra-prediction mode is derived as intra-prediction mode #0. When the information about the chroma intra-prediction mode indicates 0 and the luma intra-prediction mode is intra-prediction mode #0, the chroma intra-prediction mode is derived as intra-prediction mode #34. When the information about the chroma intra-prediction mode indicates 1 and the luma intra-prediction mode is not intra-prediction mode #26, the chroma intra-prediction mode is derived as intra-prediction mode #26. When the information about the chroma intra-prediction mode indicates 1 and the luma intra-prediction mode is intra-prediction mode #26, the chroma intra-prediction mode is derived as intra-prediction mode #34. When the information about the chroma intra-prediction mode indicates 2 and the luma intra-prediction mode is not intra-prediction mode #10, the chroma intra-prediction mode is derived as intra-prediction mode #10. When the information about the chroma intra-prediction mode indicates 2 and the luma intra-prediction mode is intra-prediction mode #10, the chroma intra-prediction mode is derived as intra-prediction mode #34. When the information about the chroma intra-prediction mode indicates 3 and the luma intra-prediction mode is not intra-prediction mode #1, the chroma intra-prediction mode is derived as intra-prediction mode #1. When the information about the chroma intra-prediction mode indicates 3 and the luma intra-prediction mode is intra-prediction mode #1, the chroma intra-prediction mode is derived as intra-prediction mode #34. When the information about the chroma intra-prediction mode indicates 4, the chroma intra-prediction mode is derived as the same mode as the luma intra-prediction mode. A case in which the information about the chroma intra-prediction mode indicates 4 may be referred to as an intra-direct mode (DM). The intra-DM is a method of deriving the same prediction mode and/or prediction direction of a chroma component as a prediction mode and/or a prediction direction of a luma component when characteristics of the luma component and the chroma component are similar in the same block.

Meanwhile, as a video codec capable of compressing high-definition images is increasingly required, a video codec which can support various input image formats using the color format of YUV 4:2:2 or 4:2:0, instead of input image formats using the color format of YUV 4:4:4 used in conventional video codecs, is proposed. Here, Y corresponds to a luma component and U and V correspond to a chroma component. Specifically, U can correspond to Cb of the chroma component and V can correspond to Cr of the chroma component.

Here, when an image using the color format of YUV 4:2:2 is input, for example, only one pixel is sampled at an interval of two pixels in the x-axis direction and all pixels are sampled in the y-axis direction with respect to a chroma component in the original image. Accordingly, the ratio of the width to the height of the chroma component differs from the ratio of the width to the height of a luma component. That is, a luma sample and a chroma sample may have different sampling rates and different sampling positions.

The concept of the color formats of YUV 4:4:4, YUV 4:2:2 and YUV 4:2:0 can be schematized as the following drawing.

Figure 3:
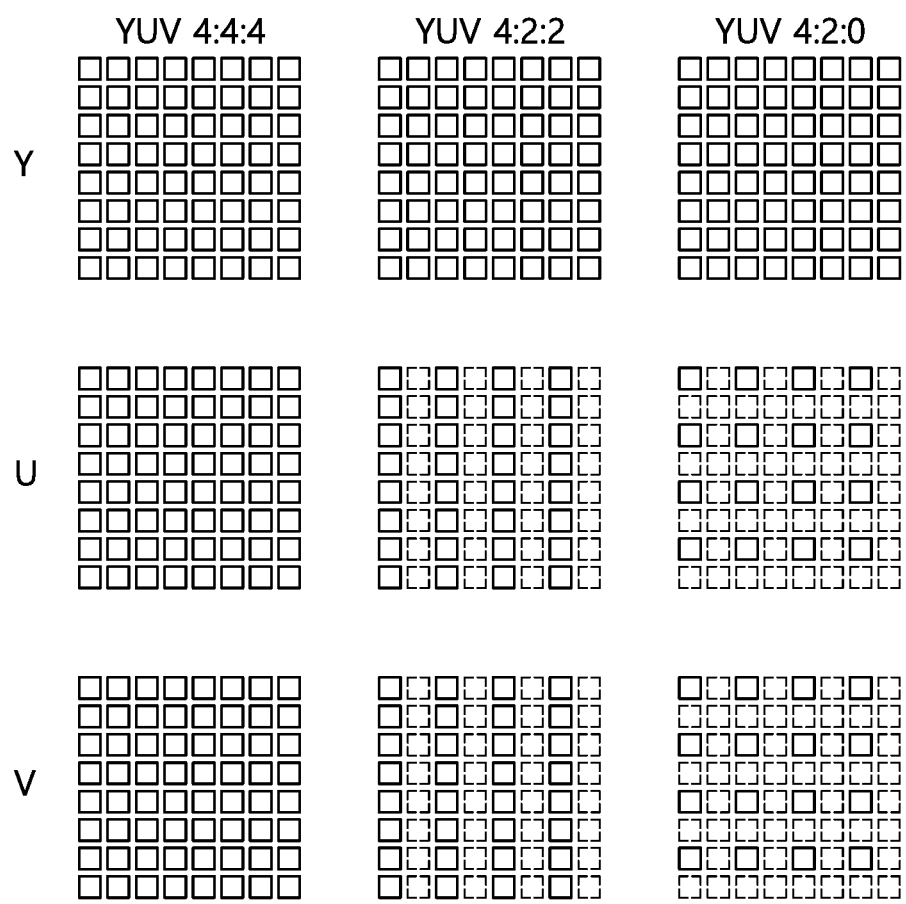
FIG. 3 schematically illustrates the concept of various YUV color formats.

FIG. 3 schematically illustrates the concept of various YUV color formats.

Referring to FIG. 3, in the case of YUV 4:4:4 color format and YUV 4:2:0 color format, the ratio of the width to the height of U and V chroma components is 1:1, which is the same as that of the Y luma component. In the case of YUV 4:2:2 color format, however, the ratio of the width to the height of the luma component, that is, the Y luma component, is 1:1, whereas the ratio of the width to the height of the chroma component is 1:2 which is not the same as that of the Y luma component.

Accordingly, if the intra-prediction mode of the luma component is used as the intra-prediction mode of the chroma component, as in the intra-DM, when the intra-prediction mode of the luma component is a directional mode, a problem that a different prediction direction from the prediction direction of the luma component may be derived for the chroma component, differently from the purpose of the intra-DM, is generated.

Figure 4:
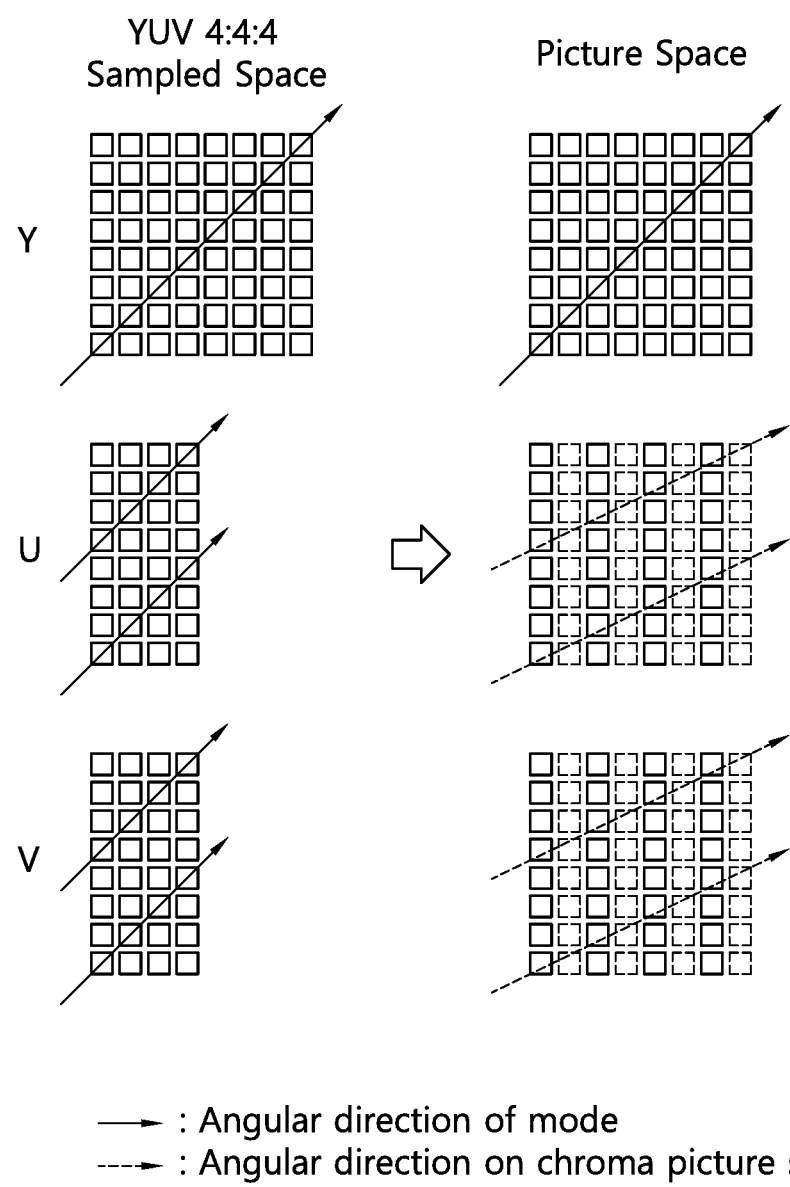
FIG. 4 illustrates prediction direction differences in a picture space when a luma component intra-prediction mode is applied as a chroma component intra-prediction mode in an input image using the YUV 4:2:2 color format.

FIG. 4 shows prediction direction differences in a picture space when an intra-prediction mode of a luma component is used as an intra-prediction mode of a chroma component in an input image using YUV 4:2:2 color format. FIG. 4 shows that a prediction direction of U and V chroma components does not correspond to a prediction direction of the Y luma component when the same intra-picture prediction direction as the intra-picture mode, $mode_y$, of the luma component is applied to the U and V chroma components in YUV 4:2:2 color format, that is, when the same directional intra-prediction mode is applied and a picture is reconstructed in the picture space without an additional transformation process.

Referring to FIG. 4, in the case of an input image using 4:2:2 color format, only one pixel is sampled at an interval of two pixels in the x-axis direction and all pixels are sampled in the y-axis direction with respect to a chroma component in the original image. Accordingly, the ratio of the width to the height of the chroma component differs from that of a luma component. Therefore, if the intra-prediction mode of the chroma component is used as the intra-prediction mode of the luma component when the intra-prediction mode of the luma component is a directional mode, the prediction direction of the intra-prediction mode of the chroma component does not correspond to the prediction direction of the intra-prediction mode of the luma component. In the case of an input image using YUV 4:4:4 color format or YUV 4:2:0 color format, the ratio of the width to the height of U and V chroma components is 1:1 and thus the direction of the luma intra-prediction mode applied to the luma component corresponds to the direction of the chroma intra-prediction mode. In the case of an input image using YUV 4:2:2 color format, however, the ratio of the width to the height of Y luma component is 1:1 whereas the ratio of the width to the height of U and V chroma components is 1:2. Accordingly, prediction directions of the luma component and chroma components differ from each other in the original image even though the luma component and chroma components have the same directional intra-prediction mode in an input image using 4:2:2 color format.

Therefore, when YUV 4:2:2 color format is used, even if a chroma intra-prediction mode that is the same as a luma intra-prediction mode is derived using the intra-DM, the prediction direction of the luma intra-prediction mode is not the same as the prediction direction of the chroma intra-prediction mode in the picture space as shown. This is because a difference between the prediction directions of the luma component and the chroma component is generated in the picture due to the aforementioned ratio difference between the luma component and the chroma component.

When the intra-prediction modes of the luma component and the chroma component indicate different directions as described above, an additional transformation process is required in order to perform intra-prediction of a chroma sample on the basis of a prediction direction identical or similar to the prediction direction of the luma intra-prediction mode in the aforementioned intra-DM. Accordingly, the present invention proposes a method of determining a chroma intra-prediction mode when a luma component (luma sample) and a chroma component (chroma sample) have different sampling rates and/or sampling positions (e.g., when the YUV 4:2:2 color format is used). Intra-directional modes among intra-prediction modes to which the present invention is applied may include the following modes.

Figure 5:
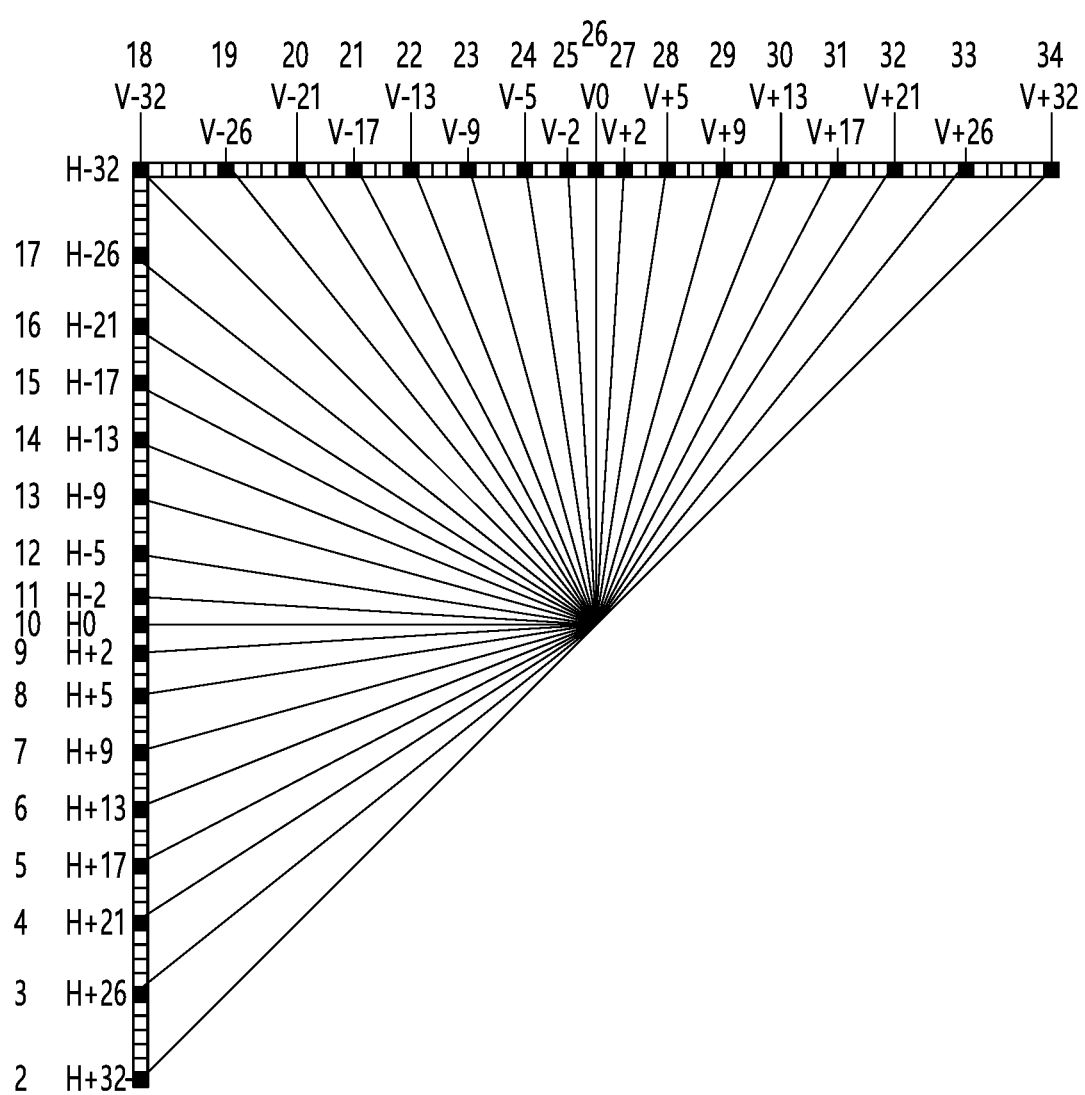
FIG. 5 illustrates exemplary angular intra modes of 33 prediction directions.

FIG. 5 shows exemplary intra-directional modes of 33 prediction directions.

Referring to FIG. 5, intra-prediction modes having horizontal directionality can be discriminated from intra-prediction modes having vertical directionality on the basis of intra-prediction mode #18 having an upper left diagonal prediction direction. In FIG. 5, H and V respectively refer to horizontal directionality and vertical directionality and numerals −32 to 32 indicate displacements in units of 1/32 at sample grid positions. Intra-prediction modes #2 to #17 have horizontal directionality and intra-prediction modes #18 to #34 have vertical directionality. Intra-prediction mode #10 and intra-prediction mode #26 respectively indicate a horizontal intra-prediction mode and a vertical intra-prediction mode, and a prediction direction of an angular intra mode can be represented as an angle on the basis of the horizontal intra-prediction mode and the vertical intra-prediction mode. In other words, relative angles corresponding to respective intra-prediction modes can be represented on the basis of horizontal reference angle 0° corresponding to intra-prediction mode #10, and relative angles corresponding to respective intra-prediction modes can be represented on the basis of vertical reference angle 0° corresponding to intra-prediction mode #26.

Figure 6:
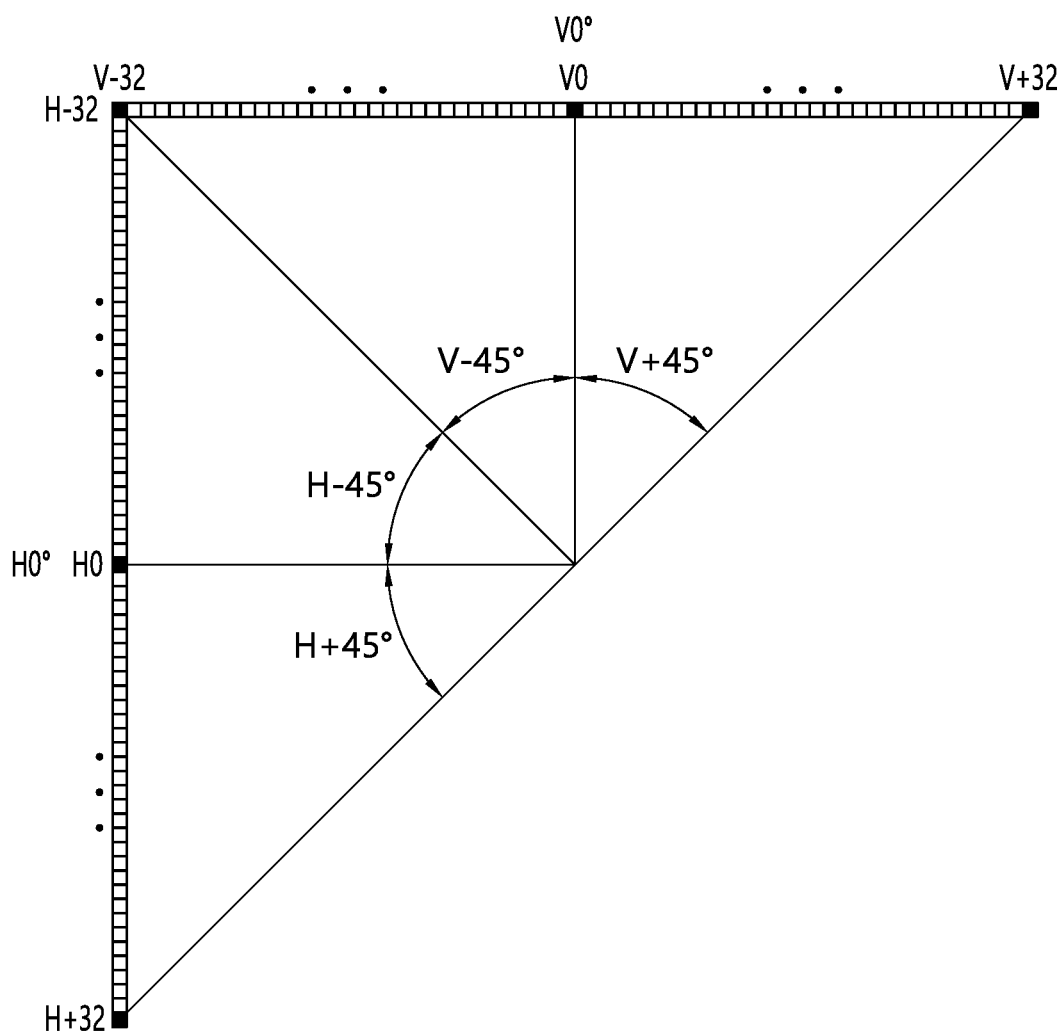
FIG. 6 illustrates horizontal and vertical angles represented on the basis of intra-prediction mode #10 and intra-prediction mode #26.

FIG. 6 shows the horizontal reference angle and the vertical reference angle represented on the basis of intra-prediction mode #10 and intra-prediction mode #26.

Referring to FIG. 6, angles of modes having prediction directions between H+1 and H+32 are represented as positive angles on the basis of horizontality and angles of modes having prediction directions between H−1 and H−32 are represented as negative angles on the basis of horizontality. That is, angles of prediction directions between H+1 and H+32 are represented as positive horizontal reference angles and angles of prediction directions between H−1 and H−32 are represented as negative horizontal reference angles on the basis of the horizontal reference angle 0° corresponding to intra-prediction mode #10. In addition, angles of modes having prediction directions between V−1 and V−32 are represented as negative angles on the basis of verticality and angles of modes having prediction directions between V+1 and V+32 are represented as positive angles on the basis of verticality. That is, angles of prediction directions between V−1 and V−32 are represented as negative vertical reference angles and angles of prediction directions between V+1 and V+32 are represented as positive vertical reference angles on the basis of the vertical reference angle 0° corresponding to intra-prediction mode #26. The represented horizontal reference angles and vertical reference angles are shown in the following table.

TABLE 4

| Mode | Hor/Ver | Angular Param. | Hor Angle | Mode | Hor/Ver | Angular Param. | Hor Angle | Ver Angle |
|---|---|---|---|---|---|---|---|---|
| 2 | Hor | 32 | 45.0 | 18 | Ver | −32 | −45.0 | −45.0 |
| 3 | Hor | 26 | 39.1 | 19 | Ver | −26 | −50.9 | −39.1 |
| 4 | Hor | 21 | 33.3 | 20 | Ver | −21 | −56.7 | −33.3 |
| 5 | Hor | 17 | 28.0 | 21 | Ver | −17 | −62.0 | −28.0 |
| 6 | Hor | 13 | 22.1 | 22 | Ver | −13 | −67.9 | −22.1 |
| 7 | Hor | 9 | 15.7 | 23 | Ver | −9 | −74.3 | −15.7 |
| 8 | Hor | 5 | 8.9 | 24 | Ver | −5 | −81.1 | −8.9 |
| 9 | Hor | 2 | 3.6 | 25 | Ver | −2 | −86.4 | −3.6 |
| 10 | Hor | 0 | 0.0 | 26 | Ver | 0 | −90.0 | 0.0 |
| 11 | Hor | −2 | −3.6 | 27 | Ver | 2 | −93.6 | 3.6 |
| 12 | Hor | −5 | −8.9 | 28 | Ver | 5 | −98.9 | 8.9 |
| 13 | Hor | −9 | −15.7 | 29 | Ver | 9 | −105.7 | 15.7 |
| 14 | Hor | −13 | −22.1 | 30 | Ver | 13 | −112.1 | 22.1 |
| 15 | Hor | −17 | −28.0 | 31 | Ver | 17 | −118.0 | 28.0 |
| 16 | Hor | −21 | −33.3 | 32 | Ver | 21 | −123.3 | 33.3 |
| 17 | Hor | −26 | −39.1 | 33 | Ver | 26 | −129.1 | 39.1 |
|  |  |  |  | 34 | Ver | 32 | −135.0 | 45.0 |

Here, the angular parameter Angular param. indicates a displacement in units of 1/32 at a sample grid position, the horizontal angle Hor Angle indicates a horizontal reference angle on the basis of the horizontal reference angle 0° corresponding to intra-prediction mode #10, and the vertical angle Ver Angle indicates a vertical reference angle on the basis of the vertical reference angle 0° corresponding to intra-prediction mode #26.

As described above, since the width of a chroma component becomes ½ of the height thereof according to the chroma component sampling method when a picture in YUV 4:2:2 color format is used, a problem that the prediction direction and prediction angle of the chroma component become different from those of a luma component in a picture space is generated when the same chroma intra-prediction mode as a luma intra-prediction mode is derived in the intra-DM. Accordingly, the present invention proposes a method of deriving an optimal chroma intra-prediction mode in consideration of sampling rate and position differences between a luma component and a chroma component. Although a case in which information about a chroma prediction mode indicates 4, that is, the intra-DM, is described as an example herein, the present invention can be applied to cases in which the information about the chroma prediction mode indicates 0 to 3 and also be applied to the 4:2:0 color format and 4:4:4 color format in addition to the YUV 4:2:2 color format.

According to an embodiment of the present invention, when the intra-DM is applied and prediction directionality of the luma intra-prediction mode is horizontal directionality, for example, one of intra-prediction modes #2 to #17, an intra-prediction mode having a horizontal reference angle value closest to a value obtained by multiplying the horizontal reference angle value of the luma intra-prediction mode by 2, among the 33 directional intra-prediction modes, is selected as the chroma intra-prediction mode. If the intra-DM is applied and prediction directionality of the luma intra-prediction mode is vertical directionality, for example, one of intra-prediction modes #18 to #34, an intra-prediction mode having a vertical reference angle value closest to a value obtained by multiplying the vertical reference angle value of the luma intra-prediction mode by 0.5, among the 33 directional intra-prediction modes, is selected as the chroma intra-prediction mode. This is represented by the following equation.

$$\text{DM\_Intra}(Mode_Y) = \begin{cases} Mode_Y, & 0 \leq Mode_Y \leq 1 \\ \underset{m \in M}{\operatorname{argmin}}\left\{\left|\frac{HAng(Mode_Y) \times}{2 - HAng(m)}\right|\right\}, & 2 \leq Mode_Y \leq 17 \\ \underset{m \in M}{\operatorname{argmin}}\left\{\left|\frac{VAng(Mode_Y) \times}{0.5 - VAng(m)}\right|\right\}, & 18 \leq Mode_Y \leq 34 \end{cases}$$ [Equation 1]

Here, $\text{DM\_Intra}(Mode_Y)$ is a chroma intra-prediction mode calculated by applying the intra-DM, $Mode_Y$ is a luma intra-prediction mode, M indicates all directional intra-prediction modes (intra-prediction modes #2 to #34), HAng(Mode) indicates a horizontal reference angle of a mode, and VAng(Mode) indicates a horizontal reference angle of a mode.

Here, the mode index of a chroma intra-prediction mode, which is calculated when a luma intra-prediction mode corresponds to intra-prediction modes #2 to #17, can be limited such that the mode index does not exceed the mode index of a chroma intra-prediction mode, which is calculated when a luma intra-prediction mode corresponds to intra-prediction mode #18. That is, if the calculated mode index exceeds the mode index, the calculated mode index can be clipped or replaced by the mode index calculated when the luma intra-prediction mode is intra-prediction mode #18. A mapping relationship between luma intra-prediction modes and chroma intra-prediction modes when the aforementioned method is applied is shown in the following table.

TABLE 5

| Intra-prediction mode | Associated name |
|---|---|
| 0 | Intra-planar |
| 1 | Intra-DC |
| 2, . . . 66 | Intra-angular 2, . . . intra-angular 66 |

Referring to Table 5, modes #0 and #1 are non-directional intra modes and respectively correspond to a planar mode and a DC intra-prediction mode. When the intra-DM is applied and a luma intra-prediction mode is mode #0 or #1, a chroma intra-prediction mode can be set to be the same as the luma intra-prediction mode.

Modes #2 to #34 are angular intra modes and respectively correspond to intra-prediction modes #2 to #34. When the intra-DM is applied and a luma intra-prediction mode is one of modes #2 to #34, a chroma intra-prediction mode can be set as shown in the above table. According to the present invention, the chroma intra-prediction mode can be derived on the basis of Equation 1 or derived on the basis of a preset table, for example, the mapping relationship of Table 3, without an additional calculation process.

Although the above description is based on a case in which the information about the chroma intra-prediction mode indicates 4, that is, the intra-DM, cases in which the information about the chroma intra-prediction mode indicates values other than 4 can be normalized and applied as follows.

Specifically, a temporal chroma intra-prediction mode can be derived on the basis of the luma intra-prediction mode and received information about a chroma intra-prediction mode. The value of the temporal chroma intra-prediction mode can be represented as a mode index modeIdx. The temporal chroma intra-prediction mode can be derived as shown in the following table.

TABLE 6

| intra_chroma_pred_mode[xPb][yPb] | IntraPredModeY[xPb][yPb] | | | | |
|---|---|---|---|---|---|
| | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

Here, IntraPredModeY[xPb][yPb] indicates the luma intra-prediction mode, and intra_chroma_pred_mode[xPb][yPb] indicates the information about the chroma intra-prediction mode. The information about the chroma intra-prediction mode can indicate a value in the range of 0 to 4 as described above. Here, the temporal chroma intra-prediction mode can be derived on the basis of the value indicated by the information about the chroma intra-prediction mode and the luma intra-prediction mode.

In this case, the chroma intra-prediction mode can be determined on the basis of the temporal intra-prediction mode and the following table.

TABLE 7

| | modeidx | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | modeidx | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| Intra(Mode$_C$) | 22 | 22 | 23 | 23 | 24 | 24 | 25 | 26 | 26 | 26 | 27 | 28 | 28 | 29 | 29 | 30 | 30 | |

Here, modeIdx indicates the temporal chroma intra-prediction mode and Intra(Mode$_c$) indicates the chroma intra-prediction mode.

The present invention can also be applied to cases in which the information about the chroma intra-prediction mode indicates values other than 4 using the above-described method.

Meanwhile, there is increasing demand for high-definition video and thus the number of angular intra-prediction modes can increase to 65 in order to improve video codec efficiency. In this case, the present invention can also be applied as described below.

Figure 7:
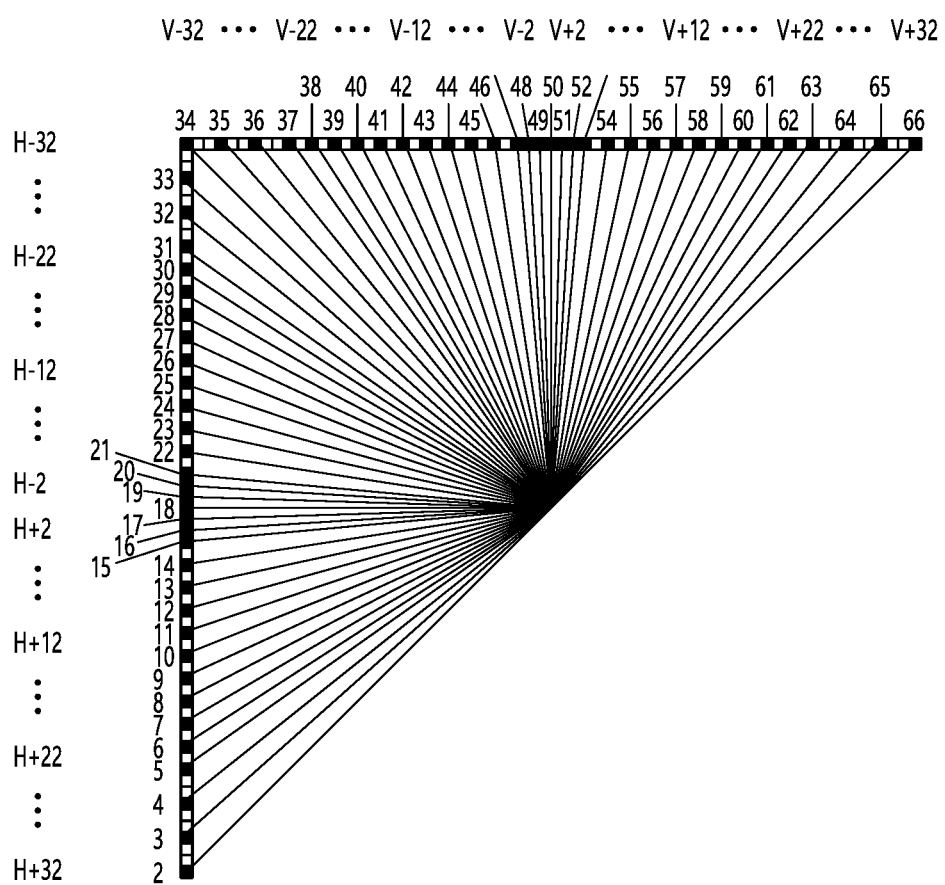
FIG. 7 illustrates exemplary angular intra modes of 65 prediction directions.

FIG. 7 shows exemplary intra angular modes of 65 prediction directions.

Referring to FIG. 7, intra-prediction modes having horizontal directionality can be discriminated from intra-prediction modes having vertical directionality on the basis of intra-prediction mode #34 having an upper left diagonal prediction direction. In FIG. 7, H and V respectively refer to horizontal directionality and vertical directionality and numerals −32 to 32 indicate displacements in units of 1/32 at sample grid positions. Intra-prediction modes #2 to #33 have horizontal directionality and intra-prediction modes #34 to #66 have vertical directionality. Intra-prediction mode #18 and intra-prediction mode #50 respectively indicate a horizontal intra-prediction mode and a vertical intra-prediction mode, and a prediction direction of an angular intra mode can be represented as an angle on the basis of the horizontal intra-prediction mode and the vertical intra-prediction mode. In other words, relative angles corresponding to respective intra-prediction modes can be represented on the basis of horizontal reference angle 0° corresponding to intra-prediction mode #18, and relative angles corresponding to respective intra-prediction modes can be represented on the basis of vertical reference angle 0° corresponding to intra-prediction mode #50. The represented horizontal reference angles and vertical reference angles are shown in the following table.

TABLE 8

| Mode | Hor/Ver | Angular Param. | Hor Angle | Mode | Hor/Ver | Angular Param. | Hor Angle | Ver Angle |
|---|---|---|---|---|---|---|---|---|
| 2 | Hor | 32 | 45.0 | 34 | Ver | −32 | −45.0 | −45.0 |
| 3 | Hor | 29 | 42.2 | 35 | Ver | −29 | −47.8 | −42.2 |
| 4 | Hor | 26 | 39.1 | 36 | Ver | −26 | −50.9 | −39.1 |
| 5 | Hor | 23 | 35.7 | 37 | Ver | −23 | −54.3 | −35.7 |
| 6 | Hor | 21 | 33.3 | 38 | Ver | −21 | −56.7 | −33.3 |
| 7 | Hor | 19 | 30.7 | 39 | Ver | −19 | −59.3 | −30.7 |
| 8 | Hor | 17 | 28.0 | 40 | Ver | −17 | −62.0 | −28.0 |
| 9 | Hor | 15 | 25.1 | 41 | Ver | −15 | −64.9 | −25.1 |
| 10 | Hor | 13 | 22.1 | 42 | Ver | −13 | −67.9 | −22.1 |
| 11 | Hor | 11 | 19.0 | 43 | Ver | −11 | −71.0 | −19.0 |
| 12 | Hor | 9 | 15.7 | 44 | Ver | −9 | −74.3 | −15.7 |
| 13 | Hor | 7 | 12.3 | 45 | Ver | −7 | −77.7 | −12.3 |
| 14 | Hor | 5 | 8.9 | 46 | Ver | −5 | −81.1 | −8.9 |
| 15 | Hor | 3 | 5.4 | 47 | Ver | −3 | −84.6 | −5.4 |
| 16 | Hor | 2 | 3.6 | 48 | Ver | −2 | −86.4 | −3.6 |
| 17 | Hor | 1 | 1.8 | 49 | Ver | −1 | −88.2 | −1.8 |
| 18 | Hor | 0 | 0.0 | 50 | Ver | 0 | −90.0 | 0.0 |
| 19 | Hor | −1 | −1.8 | 51 | Ver | 1 | −91.8 | 1.8 |
| 20 | Hor | −2 | −3.6 | 52 | Ver | 2 | −93.6 | 3.6 |
| 21 | Hor | −3 | −5.4 | 53 | Ver | 3 | −95.4 | 5.4 |
| 22 | Hor | −5 | −8.9 | 54 | Ver | 5 | −98.9 | 8.9 |
| 23 | Hor | −7 | −12.3 | 55 | Ver | 7 | −102.3 | 12.3 |
| 24 | Hor | −9 | −15.7 | 56 | Ver | 9 | −105.7 | 15.7 |
| 25 | Hor | −11 | −19.0 | 57 | Ver | 11 | −109.0 | 19.0 |
| 26 | Hor | −13 | −22.1 | 58 | Ver | 13 | −112.1 | 22.1 |
| 27 | Hor | −15 | −25.1 | 59 | Ver | 15 | −115.1 | 25.1 |
| 28 | Hor | −17 | −28.0 | 60 | Ver | 17 | −118.0 | 28.0 |
| 29 | Hor | −19 | −30.7 | 61 | Ver | 19 | −120.7 | 30.7 |
| 30 | Hor | −21 | −33.3 | 62 | Ver | 21 | −123.3 | 33.3 |
| 31 | Hor | −23 | −35.7 | 63 | Ver | 23 | −125.7 | 35.7 |
| 32 | Hor | −26 | −39.1 | 64 | Ver | 26 | −129.1 | 39.1 |
| 33 | Hor | −29 | −42.2 | 65 | Ver | 29 | −132.2 | 42.2 |
|  |  |  |  | 66 | Ver | 32 | −135.0 | 45.0 |

Here, the angular parameter Angular param. indicates a displacement in units of 1/32 at a sample grid position, the horizontal angle Hor Angle indicates a horizontal reference angle on the basis of the horizontal reference angle 0° corresponding to intra-prediction mode #18, and the vertical angle Ver Angle indicates a vertical reference angle on the basis of the vertical reference angle 0° corresponding to intra-prediction mode #50.

According to another embodiment of the present invention, when the intra-DM is applied and prediction directionality of the luma intra-prediction mode is horizontal directionality, for example, one of intra-prediction modes #2 to #33, an intra-prediction mode having a horizontal reference angle value closest to a value obtained by multiplying the horizontal reference angle value of the luma intra-prediction mode by 2, among the 65 directional intra-prediction modes, is selected as the chroma intra-prediction mode. If the intra-DM is applied and prediction directionality of the luma intra-prediction mode is vertical directionality, for example, one of intra-prediction modes #34 to #66, an intra-prediction mode having a vertical reference angle value closest to a value obtained by multiplying the vertical reference angle value of the luma intra-prediction mode by 0.5, among the 65 directional intra-prediction modes, is selected as the chroma intra-prediction mode. This is represented by the following equation.

$$DM\_Intra(Mode_Y) = \begin{cases} Mode_Y, & 0 \leq Mode_Y \leq 1 \\ \underset{m \in M}{\operatorname{argmin}}\left\{\left|\dfrac{HAng(Mode_Y) \times}{2 - HAng(m)}\right|\right\}, & 2 \leq Mode_Y \leq 33 \\ \underset{m \in M}{\operatorname{argmin}}\left\{\left|\dfrac{VAng(Mode_Y) \times}{0.5 - VAng(m)}\right|\right\}, & 34 \leq Mode_Y \leq 66 \end{cases}$$ [Equation 2]

Here, $DM\_Intra(Mode_Y)$ is a chroma intra-prediction mode calculated by applying the intra-DM, $Mode_Y$ is a luma intra-prediction mode, M indicates all directional intra-prediction modes (intra-prediction modes #2 to #66), HAng (Mode) indicates a horizontal reference angle of a mode, and VAng(Mode) indicates a horizontal reference angle of a mode.

Here, the mode index of a chroma intra-prediction mode, which is calculated when a luma intra-prediction mode corresponds to intra-prediction modes #2 to #33, can be limited such that the mode index does not exceed the mode index of a chroma intra-prediction mode, which is calculated when a luma intra-prediction mode corresponds to intra-prediction mode #34. That is, if the calculated mode index exceeds the mode index, the calculated mode index can be clipped or replaced by the mode index calculated when the luma intra-prediction mode is intra-prediction mode #34. A mapping relationship between luma intra-prediction modes and chroma intra-prediction modes when the aforementioned method is applied is shown in the following table.

TABLE 9

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| 4:2:2 DM_Intra mode | 0 | 1 | 2 | 2 | 2 | 2 | 2 | 2 | 2 | 2 | 2 | 2 | 4 | 7 | 9 | 11 | 13 | 14 | 16 |

| | Luma mode | | | | | | | | | | | | | | | | | |
|---|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 | 35 |
| 4:2:2 DM_Intra mode | 18 | 20 | 22 | 23 | 25 | 27 | 29 | 32 | 34 | 36 | 38 | 40 | 42 | 42 | 42 | 42 | 42 | 42 |

| | Luma mode | | | | | | | | | | | | | | | | | |
|---|---|---|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 | 51 | 52 | 53 |
| 4:2:2 DM_Intra mode | 43 | 43 | 44 | 44 | 45 | 45 | 45 | 46 | 46 | 47 | 48 | 49 | 49 | 50 | 50 | 50 | 51 | 51 |

| | Luma mode | | | | | | | | | | | | |
|---|---|---|---|---|---|---|---|---|---|---|---|---|---|
| | 54 | 55 | 56 | 57 | 58 | 59 | 60 | 61 | 62 | 63 | 64 | 65 | 66 |
| 4:2:2 DM_Inta mode | 52 | 53 | 54 | 54 | 55 | 55 | 55 | 56 | 56 | 57 | 57 | 58 | 58 |

Referring to Table 9, modes #0 and #1 are non-directional intra modes and respectively correspond to a planar mode and a DC intra-prediction mode. When the intra-DM is applied and a luma intra-prediction mode is mode #0 or #1, a chroma intra-prediction mode can be set to be the same as the luma intra-prediction mode.

Modes #2 to #66 are angular intra modes and respectively correspond to intra-prediction modes #2 to #66. When the intra-DM is applied and a luma intra-prediction mode is one of modes #2 to #66, a chroma intra-prediction mode can be set as shown in the above table. According to the present invention, the chroma intra-prediction mode can be derived on the basis of Equation 2 or derived on the basis of a preset table, for example, the mapping relationship of Table 9, without an additional calculation process.

Figure 8:
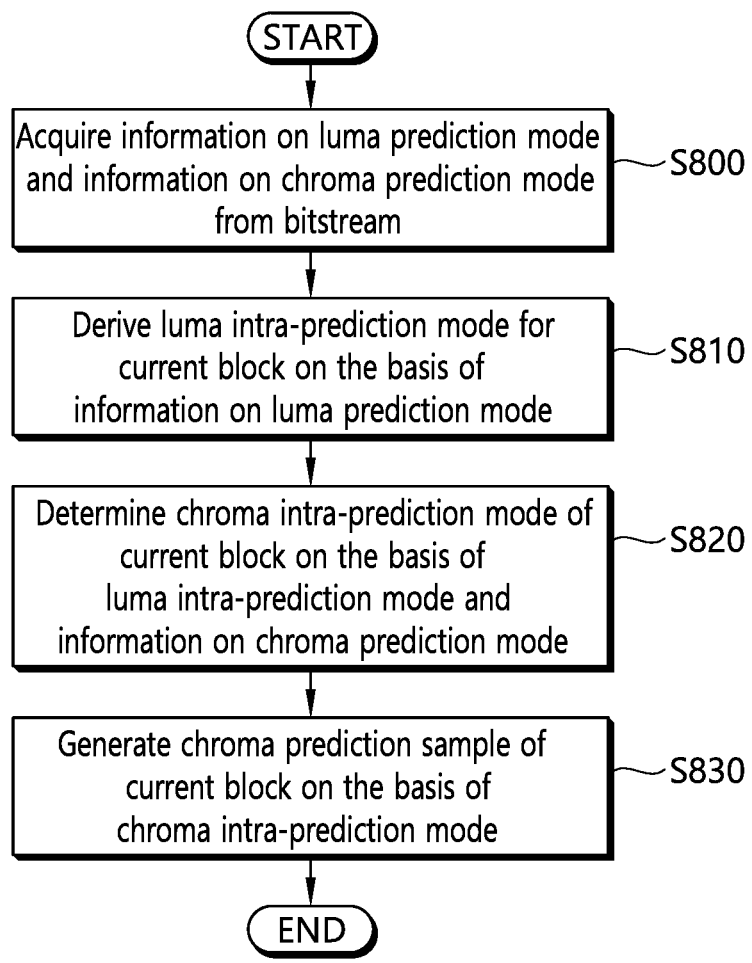
FIG. 8 schematically illustrates an example of an intra-prediction method of a decoding device according to the present invention.

FIG. 8 schematically illustrates an example of an intra-prediction method of the decoding device according to the present invention. The method shown in FIG. 8 can be performed by the decoding device. Specifically, S800 in FIG. 8 can be performed by the entropy decoder of the decoding device and S810 to S830 can be performed by the predictor of the decoding device.

Referring to FIG. 8, the decoding device acquires information about a luma prediction mode and information about a chroma prediction mode from a bitstream (S800). The decoding device may decode the bitstream received from an encoding device and acquire the information about the prediction modes.

The information about the luma prediction mode may include index information indicating a luma intra-prediction mode. The value of the information about the chroma prediction mode can be one of 0 to 4. The bitstream may be received through a network or a storage medium.

The decoding device derives a luma intra-prediction mode with respect to a current block on the basis of the information about the luma prediction mode (S810). The decoding device may determine the luma intra-prediction mode according to whether the most probable mode (PMP) or the remaining mode is applied. When the MPM is applied, an MPM list may be determined on the basis of an intra-prediction mode with respect to a left or upper neighboring block of the current block, and the intra-prediction mode may be determined on the basis of the MPM list and the index information. When the remaining mode is applied, the intra-prediction mode may be determined from among prediction modes that are not included in the MPM list on the basis of the index information.

The luma intra-prediction mode may be one of 35 modes. Alternatively, the luma intra-prediction mode may be one of 67 modes.

The decoding device determines a chroma intra-prediction mode of the current block on the basis of the luma intra-prediction mode and the information about the chroma prediction mode (S820).

For example, the luma intra-prediction mode can be one of predefined intra-prediction modes #0 to #34. In this case, if the value of the information about the chroma intra-prediction mode indicates 4 (i.e., the intra-DM) and the luma intra-prediction mode is one of intra-prediction modes #18 to #25, the decoding device can determine the chroma intra-prediction mode as an intra-prediction mode having a higher number than the luma intra-prediction mode. If the value of the information about the chroma intra-prediction mode indicates 4 and the luma intra-prediction mode is one of intra-prediction modes #27 to #34, the decoding device can determine the chroma intra-prediction mode as an intra-prediction mode having a lower number than the luma intra-prediction mode. If the value of the information about the chroma intra-prediction mode indicates 4 and the luma intra-prediction mode is one of intra-prediction modes #3 to #9, the decoding device can determine the chroma intra-prediction mode as an intra-prediction mode having a lower number than the luma intra-prediction mode. If the value of the information about the chroma intra-prediction mode indicates 4 and the luma intra-prediction mode is one of intra-prediction modes #11 to #17, the decoding device can determine the chroma intra-prediction mode as an intra-prediction mode having a higher number than the luma intra-prediction mode. If the value of the information about the chroma intra-prediction mode indicates 4 and the luma intra-prediction mode is intra-prediction modes #0 or #1, the decoding device can determine the chroma intra-prediction mode as the same mode as the luma intra-prediction mode.

In this case, specifically, the decoding device can determine the chroma intra-prediction mode on the basis of the following equation.

$$Intra(Mode_C) = \begin{cases} Mode_Y, & 0 \leq Mode_Y \leq 1 \\ \underset{m \in M}{\operatorname{argmin}}\left\{\left|\dfrac{HAng(Mode_Y) \times 2 - HAng(m)}{}\right|\right\}, & 2 \leq Mode_Y \leq 17 \\ \underset{m \in M}{\operatorname{argmin}}\left\{\left|\dfrac{VAng(Mode_Y) \times 0.5 - VAng(m)}{}\right|\right\}, & 18 \leq Mode_Y \leq 34 \end{cases}$$

[Equation 3]

Here, Intra(Mode$_C$) indicates the chroma intra-prediction mode determined by the decoding device, Mode$_Y$ indicates the luma intra-prediction mode, M represents angular prediction modes #2 to #34, HAng(Mode) represents a horizontal reference angle corresponding to an intra-prediction mode, and VAng(Mode) indicates a vertical reference angle corresponding to an intra-prediction mode. The decoding device can determine the chroma intra-prediction mode on the basis of the above equation. Specifically, when the intra-DM is applied and prediction directionality of the luma intra-prediction mode is horizontal directionality, for example, one of intra-prediction modes #2 to #17, the decoding device can determine an intra-prediction mode having a horizontal reference angle value closest to a value obtained by multiplying the horizontal reference angle value of the luma intra-prediction mode by 2, among the 33 directional intra-prediction modes, as the chroma intra-prediction mode. If the intra-DM is applied and prediction directionality of the luma intra-prediction mode is vertical directionality, for example, one of intra-prediction modes #18 to #34, the decoding device can determine an intra-prediction mode having a vertical reference angle value closest to a value obtained by multiplying the vertical reference angle value of the luma intra-prediction mode by 0.5, among the 33 directional intra-prediction modes, as the chroma intra-prediction mode. In this case, the decoding device may limit the mode index of a chroma intra-prediction mode, which is calculated when a luma intra-prediction mode corresponds to intra-prediction modes #2 to #17, such that the mode index does not exceed the mode index of a chroma intra-prediction mode, which is calculated when a luma intra-prediction mode corresponds to intra-prediction mode #18. That is, if the calculated mode index exceeds the mode index, the decoding device can clip or replace the calculated mode index by the mode index calculated when the luma intra-prediction mode is intra-prediction mode #18. A mapping relationship between luma intra-prediction modes and chroma intra-prediction modes when the aforementioned method is applied is shown in the following table 10.

TABLE 10

| | Luma mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | Luma mode | | | | | | | | | | | | | | | | |
| | 18 | 19 | 20 | 21 | 22 | 23 | 24 | 25 | 26 | 27 | 28 | 29 | 30 | 31 | 32 | 33 | 34 |
| Intra(Mode$_C$) | 22 | 22 | 23 | 23 | 24 | 24 | 25 | 26 | 26 | 26 | 27 | 28 | 28 | 29 | 29 | 30 | 30 |

Here, Luma mode indicates the luma intra-prediction mode and Intra(Mode$_C$) indicates the chroma intra-prediction mode determined by the decoding device. The decoding device can determine the chroma intra-prediction mode on the basis of a preset table, for example, the mapping relationship of Table 10, without an additional calculation process.

Alternatively, the decoding device may derive a temporal chroma prediction mode on the basis of the luma intra-prediction mode and the information about the chroma intra-prediction mode. The temporal chroma prediction mode may be derived on the basis of Table 6. Then, the decoding device may determine the chroma intra-prediction mode on the basis of the following table 11 below and the temporal chroma intra-prediction mode. In this case, the chroma intra-prediction mode can be derived on the basis of the temporal chroma prediction mode when the information about the chroma intra-prediction mode indicates 0 to 3 in addition to 4.

TABLE 11

| | modeidx | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | modeidx | | | | | | | | | | | | | | | | |
| | 18 | 19 | 20 | 21 | 22 | 23 | 24 | 25 | 26 | 27 | 28 | 29 | 30 | 31 | 32 | 33 | 34 |
| Intra(Mode$_C$) | 22 | 22 | 23 | 23 | 24 | 24 | 25 | 26 | 26 | 26 | 27 | 28 | 28 | 29 | 29 | 30 | 30 |

Here, modeIdx indicates the temporal chroma prediction mode and Intra(Mode$_c$) indicates the chroma intra-prediction mode.

As another example, the luma intra-prediction mode can be one of predefined intra-prediction modes #0 to #66. In this case, if the value of the information about the chroma intra-prediction mode indicates 4 and the luma intra-prediction mode is one of intra-prediction modes #34 to #49, the decoding device can determine the chroma intra-prediction mode as an intra-prediction mode having a higher number than the luma intra-prediction mode. If the value of the information about the chroma intra-prediction mode indicates 4 and the luma intra-prediction mode is one of intra-prediction modes #51 to #66, the decoding device can determine the chroma intra-prediction mode as an intra-prediction mode having a lower number than the luma intra-prediction mode. If the value of the information about the chroma intra-prediction mode indicates 4 and the luma intra-prediction mode is one of intra-prediction modes #3 to #17, the decoding device can determine the chroma intra-prediction mode as an intra-prediction mode having a lower number than the luma intra-prediction mode. If the value of the information about the chroma intra-prediction mode indicates 4 and the luma intra-prediction mode is one of intra-prediction modes #19 to #33, the decoding device can determine the chroma intra-prediction mode as an intra-prediction mode having a higher number than the luma intra-prediction mode. If the value of the information about the chroma intra-prediction mode indicates 4 and the luma intra-prediction mode is intra-prediction modes #0 or #1, the decoding device can determine the chroma intra-prediction mode as the same mode as the luma intra-prediction mode.

Alternatively, specifically, the decoding device can determine the chroma intra-prediction mode on the basis of the following equation.

$$Intra(Mode_C) = \begin{cases} Mode_Y, & 0 \leq Mode_Y \leq 1 \\ \underset{m \in M}{\operatorname{argmin}}\left\{\left|\begin{array}{c}HAng(Mode_Y) \times \\ 2 - HAng(m)\end{array}\right|\right\}, & 2 \leq Mode_Y \leq 33 \\ \underset{m \in M}{\operatorname{argmin}}\left\{\left|\begin{array}{c}VAng(Mode_Y) \times \\ 0.5 - VAng(m)\end{array}\right|\right\}, & 34 \leq Mode_Y \leq 66 \end{cases}$$

[Equation 4]

Here, Intra(Mode$_c$) indicates the chroma intra-prediction mode determined by the decoding device, Mode$_Y$ indicates the luma intra-prediction mode, M represents angular prediction modes #2 to #66, HAng(Mode) represents a horizontal reference angle corresponding to an intra-prediction mode, and VAng(Mode) indicates a vertical reference angle corresponding to an intra-prediction mode. The decoding device can determine the chroma intra-prediction mode on the basis of the above equation. Specifically, when the intra-DM is applied and prediction directionality of the luma intra-prediction mode is horizontal directionality, for example, one of intra-prediction modes #2 to #33, the decoding device can determine an intra-prediction mode having a horizontal reference angle value closest to a value obtained by multiplying the horizontal reference angle value of the luma intra-prediction mode by 2, among the 65 directional intra-prediction modes, as the chroma intra-prediction mode. If the intra-DM is applied and prediction directionality of the luma intra-prediction mode is vertical directionality, for example, one of intra-prediction modes #34 to #66, the decoding device can determine an intra-prediction mode having a vertical reference angle value closest to a value obtained by multiplying the vertical reference angle value of the luma intra-prediction mode by 0.5, among the 65 directional intra-prediction modes, as the chroma intra-prediction mode. In this case, the decoding device may limit the mode index of a chroma intra-prediction mode, which is calculated when a luma intra-prediction mode corresponds to intra-prediction modes #2 to #33, such that the mode index does not exceed the mode index of a chroma intra-prediction mode, which is calculated when a luma intra-prediction mode corresponds to intra-prediction mode #34. That is, if the calculated mode index exceeds the mode index, the decoding device can clip or replace the calculated mode index by the mode index calculated when the luma intra-prediction mode is intra-prediction mode #34.

A mapping relationship between luma intra-prediction modes and chroma intra-prediction modes when the aforementioned method is applied is shown in the following table 12.

TABLE 12

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 2 | 2 | 2 | 2 | 4 | 7 | 9 | 11 | 13 | 14 | 16 |

| | Luma mode | | | | | | | | | | | | | | | | | |
|---|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 | 35 |
| Intra(Mode$_C$) | 18 | 20 | 22 | 23 | 25 | 27 | 29 | 32 | 34 | 36 | 38 | 40 | 42 | 42 | 42 | 42 | 42 | 42 |

| | Luma mode | | | | | | | | | | | | | | | | | |
|---|---|---|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 | 51 | 52 | 53 |
| Intra(Mode$_C$) | 43 | 43 | 44 | 44 | 45 | 45 | 45 | 46 | 46 | 47 | 48 | 49 | 49 | 50 | 50 | 50 | 51 | 51 |

| | Luma mode | | | | | | | | | | | | |
|---|---|---|---|---|---|---|---|---|---|---|---|---|---|
| | 54 | 55 | 56 | 57 | 58 | 59 | 60 | 61 | 62 | 63 | 64 | 65 | 66 |
| Intra(Mode$_C$) | 52 | 53 | 54 | 54 | 55 | 55 | 55 | 56 | 56 | 57 | 57 | 58 | 58 |

Here, Luma mode indicates the luma intra-prediction mode and Intra(Mode$_c$) indicates the chroma intra-prediction mode determined by the decoding device. The decoding device can determine the chroma intra-prediction mode on the basis of a preset table, for example, the mapping relationship of Table 12, without an additional calculation process.

The decoding device generates a chroma prediction sample of the current block on the basis of the chroma intra-prediction mode (S830). In this case, the decoding device may generate the chroma prediction sample using neighboring chroma reconstructed samples of the current block according to the chroma intra-prediction mode.

The decoding device may generate a reconstructed sample on the basis of the chroma prediction sample. The decoding device may receive a residual signal from the encoding device and generate a (chroma) residual sample for the current block. In this case, the decoding device can generate the reconstructed sample on the basis of the chroma prediction sample and the residual sample.

Thereafter, the decoding device may apply deblocking filtering and/or an in-loop filtering procedure, such as an SAO procedure, to the reconstructed picture in order to improve subjective/objective video quality as necessary, as described above.

Figure 9:
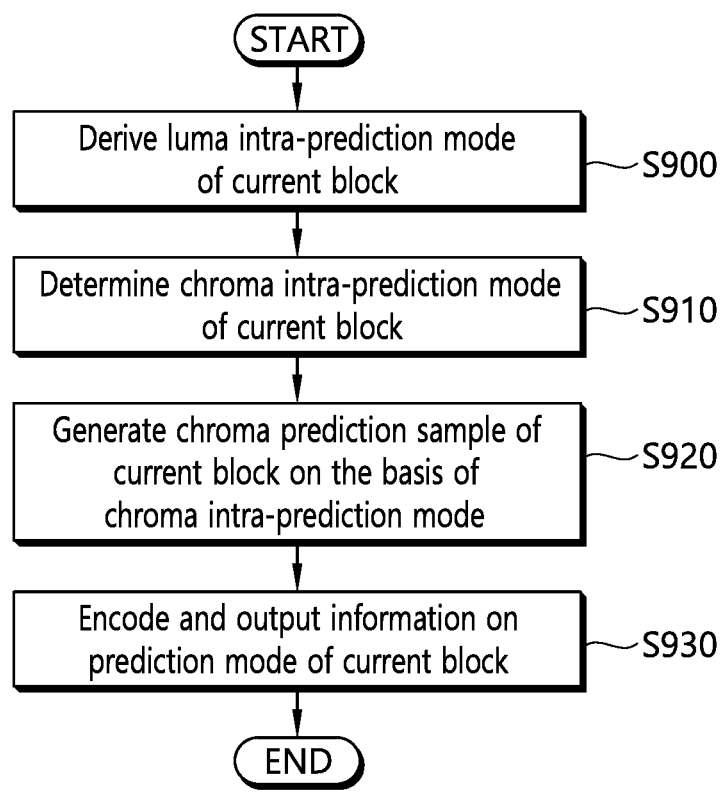
FIG. 9 schematically illustrates an example of an intra-prediction method of an encoding device according to the present invention.

FIG. 9 schematically illustrates an example of an intra-prediction method of the encoding device according to the present invention. The method shown in FIG. 9 can be performed by the encoding device. Specifically, S900 to S920 in FIG. 9 can be performed by the predictor of the encoding device and S930 can be performed by the entropy encoder of the encoding device.

Referring to FIG. 9, the encoding device derives a luma intra-prediction mode of the current block (S900). The encoding device may determine an optimal luma intra-prediction mode on the basis of RS cost. In this case, the encoding device may determine whether the MPM or the remaining mode is applied in order to signal information about the determined luma intra-prediction mode and signal the information about the luma intra-prediction mode including information about the determined result.

The luma intra-prediction mode may be one of 35 modes or one of 67 intra-prediction modes.

The encoding device determines a chroma intra-prediction mode of the current block (S910). The encoding device may determine an optimal chroma intra-prediction mode on the basis of the RD cost. In this case, the encoding device may generate information about the chroma intra-prediction mode for indicating the chroma intra-prediction mode on the basis of correlation between the luma intra-prediction mode and the chroma intra-prediction mode.

For example, the luma intra-prediction mode can be one of predefined intra-prediction modes #0 to #34. In this case, if the value of the information about the chroma intra-prediction mode indicates 4 (i.e., the intra-DM) and the luma intra-prediction mode is one of intra-prediction modes #18 to #25, the chroma intra-prediction mode can be indicated as an intra-prediction mode having a higher number than the luma intra-prediction mode. If the value of the information about the chroma intra-prediction mode indicates 4 and the luma intra-prediction mode is one of intra-prediction modes #27 to #34, the chroma intra-prediction mode can be indicated as an intra-prediction mode having a lower number than the luma intra-prediction mode. If the value of the information about the chroma intra-prediction mode indicates 4 and the luma intra-prediction mode is one of intra-prediction modes #3 to #9, the chroma intra-prediction mode can be indicated as an intra-prediction mode having a lower number than the luma intra-prediction mode. If the value of the information about the chroma intra-prediction mode indicates 4 and the luma intra-prediction mode is one of intra-prediction modes #11 to #17, the chroma intra-prediction mode can be indicated as an intra-prediction mode having a higher number than the luma intra-prediction mode. If the value of the information about the chroma intra-prediction mode indicates 4 and the luma intra-prediction mode is intra-prediction modes #0 or #1, the chroma intra-prediction mode can be indicated as the same mode as the luma intra-prediction mode.

In this case, specifically, the encoding device can indicate the chroma intra-prediction mode on the basis of the following equation.

$$Intra(Mode_C) = \begin{cases} Mode_Y, & 0 \le Mode_Y \le 1 \\ \underset{m \in M}{\arg\min}\left\{\left|\frac{HAng(Mode_Y) \times}{2 - HAng(m)}\right|\right\}, & 2 \le Mode_Y \le 17 \\ \underset{m \in M}{\arg\min}\left\{\left|\frac{VAng(Mode_Y) \times}{0.5 - VAng(m)}\right|\right\}, & 18 \le Mode_Y \le 34 \end{cases}$$ [Equation 5]

Here, Intra(Mode$_c$) indicates the chroma intra-prediction mode determined by the decoding device, Mode$_Y$ indicates the luma intra-prediction mode, M represents angular prediction modes #2 to #34, HAng(Mode) represents a horizontal reference angle corresponding to an intra-prediction mode, and VAng(Mode) indicates a vertical reference angle corresponding to an intra-prediction mode. The encoding device can indicate the chroma intra-prediction mode on the basis of the above equation. Specifically, when the intra-DM is applied and prediction directionality of the luma intra-prediction mode is horizontal directionality, for example, one of intra-prediction modes #2 to #17, an intra-prediction mode having a horizontal reference angle value closest to a value obtained by multiplying the horizontal reference angle value of the luma intra-prediction mode by 2, among the 33 directional intra-prediction modes, can be indicated as the chroma intra-prediction mode. If the intra-DM is applied and prediction directionality of the luma intra-prediction mode is vertical directionality, for example, one of intra-prediction modes #18 to #34, an intra-prediction mode having a vertical reference angle value closest to a value obtained by multiplying the vertical reference angle value of the luma intra-prediction mode by 0.5, among the 33 directional intra-prediction modes, can be indicated as the chroma intra-prediction mode. In this case, the mode index of a chroma intra-prediction mode, which is calculated when a luma intra-prediction mode corresponds to intra-prediction modes #2 to #17, may be limited such that the mode index does not exceed the mode index of a chroma intra-prediction mode, which is calculated when a luma intra-prediction mode corresponds to intra-prediction mode #18. That is, if the calculated mode index exceeds the mode index, the calculated mode index can be clipped or replaced by the mode index calculated when the luma intra-prediction mode is intra-prediction mode #18. A mapping relationship between luma intra-prediction modes and chroma intra-prediction modes when the aforementioned method is applied is shown in the following table 13.

TABLE 13

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | Luma mode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| Intra(Mode$_C$) | 22 | 22 | 23 | 23 | 24 | 24 | 25 | 26 | 26 | 26 | 27 | 28 | 28 | 29 | 29 | 30 | 30 | |

Here, Luma mode indicates the luma intra-prediction mode and Intra(Mode$_c$) indicates the chroma intra-prediction mode determined by the encoding device. The encoding device can determine the chroma intra-prediction mode on the basis of a preset table, for example, the mapping relationship of Table 13, without an additional calculation process.

Alternatively, the encoding device may derive a temporal chroma prediction mode on the basis of the luma intra-prediction mode and the information about the chroma intra-prediction mode. The temporal chroma prediction mode may be derived on the basis of Table 6. Then, the encoding device may indicate the chroma intra-prediction mode on the basis of the following table 14 below and the temporal chroma intra-prediction mode. In this case, the chroma intra-prediction mode can be indicated on the basis of the temporal chroma prediction mode when the information about the chroma intra-prediction mode indicates 0 to 3 in addition to 4.

TABLE 14

| | modeidx | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | modeidx | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| Intra(Mode$_C$) | 22 | 22 | 23 | 23 | 24 | 24 | 25 | 26 | 26 | 26 | 27 | 28 | 28 | 29 | 29 | 30 | 30 | |

Here, modeIdx indicates the temporal chroma prediction mode and Intra(Mode$_c$) indicates the chroma intra-prediction mode determined by the encoding device.

As another example, the luma intra-prediction mode can be one of predefined intra-prediction modes #0 to #66. In this case, if the value of the information about the chroma intra-prediction mode indicates 4 and the luma intra-prediction mode is one of intra-prediction modes #34 to #49, the chroma intra-prediction mode can be indicated as an intra-prediction mode having a higher number than the luma intra-prediction mode. If the value of the information about the chroma intra-prediction mode indicates 4 and the luma intra-prediction mode is one of intra-prediction modes #51 to #66, the chroma intra-prediction mode can be indicated as an intra-prediction mode having a lower number than the luma intra-prediction mode. If the value of the information about the chroma intra-prediction mode indicates 4 and the luma intra-prediction mode is one of intra-prediction modes #3 to #17, the chroma intra-prediction mode can be indicated as an intra-prediction mode having a lower number than the luma intra-prediction mode. If the value of the information about the chroma intra-prediction mode indicates 4 and the luma intra-prediction mode is one of intra-prediction modes #19 to #33, the chroma intra-prediction mode can be indicated as an intra-prediction mode having a higher number than the luma intra-prediction mode. If the value of the information about the chroma intra-prediction mode indicates 4 and the luma intra-prediction mode is intra-prediction modes #0 or #1, the chroma intra-prediction mode can be indicated as the same mode as the luma intra-prediction mode.

Alternatively, specifically, the encoding device can indicate the chroma intra-prediction mode on the basis of the following equation.

$$Intra(Mode_C) = \begin{cases} Mode_Y, & 0 \leq Mode_Y \leq 1 \\ \underset{m \in M}{\operatorname{argmin}}\left\{\left|\frac{HAng(Mode_Y) \times}{2 - HAng(m)}\right|\right\}, & 2 \leq Mode_Y \leq 33 \\ \underset{m \in M}{\operatorname{argmin}}\left\{\left|\frac{VAng(Mode_Y) \times}{0.5 - VAng(m)}\right|\right\}, & 34 \leq Mode_Y \leq 66 \end{cases}$$ [Equation 6]

Here, Intra(Mode$_c$) indicates the chroma intra-prediction mode determined by the encoding device, Mode$_Y$ indicates the luma intra-prediction mode, M represents angular prediction modes #2 to #66, HAng(Mode) represents a horizontal reference angle corresponding to an intra-prediction mode, and VAng(Mode) indicates a vertical reference angle corresponding to an intra-prediction mode. The encoding device can indicate the chroma intra-prediction mode on the basis of the above equation. Specifically, when the intra-DM is applied and prediction directionality of the luma intra-prediction mode is horizontal directionality, for example, one of intra-prediction modes #2 to #33, an intra-prediction mode having a horizontal reference angle value closest to a value obtained by multiplying the horizontal reference angle value of the luma intra-prediction mode by 2, among the 65 directional intra-prediction modes, can be indicated as the chroma intra-prediction mode. If the intra-DM is applied and prediction directionality of the luma intra-prediction mode is vertical directionality, for example, one of intra-prediction modes #34 to #66, an intra-prediction mode having a vertical reference angle value closest to a value obtained by multiplying the vertical reference angle value of the luma intra-prediction mode by 0.5, among the 65 directional intra-prediction modes, can be indicated as the chroma intra-prediction mode. In this case, the mode index of a chroma intra-prediction mode, which is calculated when a luma intra-prediction mode corresponds to intra-prediction modes #2 to #33, may be limited such that the mode index does not exceed the mode index of a chroma intra-prediction mode, which is calculated when a luma intra-prediction mode corresponds to intra-prediction mode #34. That is, if the calculated mode index exceeds the mode index, the calculated mode index may be clipped or replaced by the mode index calculated when the luma intra-prediction mode is intra-prediction mode #34. A mapping relationship between luma intra-prediction modes and chroma intra-prediction modes when the aforementioned method is applied is shown in the following table 15.

mitted or stored in the form of a bitstream in units of a network abstraction layer (NAL).

According to the above-described present invention, it is possible to determine a chroma intra-prediction mode suitable for intra-prediction of the current block of an input video including a luma component and a chroma component and thus to improve intra-prediction performance.

In addition, according to the present invention, it is possible to transform a prediction mode and/or a prediction direction of a luma intra-prediction mode to determine a chroma intra-prediction mode reflecting a ratio difference between the luma component and the chroma component of the input video and thus to improve intra-prediction performance.

Furthermore, according to the present invention, it is possible to adaptively derive a chroma prediction mode corresponding to various luma prediction modes and thus to improve prediction efficiency.

In the above-described embodiments, methods are described on the basis of a flowchart using a series of steps or blocks, but the present invention is not limited to the sequence of steps. Some steps may occur simultaneously or in a different sequence than the steps described above. Further, those skilled in the art will understand that the steps illustrated in the sequence diagram are not exclusive, that

TABLE 15

| | Luma mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 2 | 2 | 2 | 2 | 4 | 7 | 9 | 11 | 13 | 14 | 16 |
| | Luma mode | | | | | | | | | | | | | | | | |
| | 18 | 19 | 20 | 21 | 22 | 23 | 24 | 25 | 26 | 27 | 28 | 29 | 30 | 31 | 32 | 33 | 34 | 35 |
| Intra(Mode$_C$) | 18 | 20 | 22 | 23 | 25 | 27 | 29 | 32 | 34 | 36 | 38 | 40 | 42 | 42 | 42 | 42 | 42 | 42 |
| | Luma mode | | | | | | | | | | | | | | | | |
| | 36 | 37 | 38 | 39 | 40 | 41 | 42 | 43 | 44 | 45 | 46 | 47 | 48 | 49 | 50 | 51 | 52 | 53 |
| Intra(Mode$_C$) | 43 | 43 | 44 | 44 | 45 | 45 | 45 | 46 | 46 | 47 | 48 | 49 | 49 | 50 | 50 | 50 | 51 | 51 |
| | Luma mode | | | | | | | | | | | | | | | | |
| | 54 | 55 | 56 | 57 | 58 | 59 | 60 | 61 | 62 | 63 | 64 | 65 | 66 | | | | | |
| Intra(Mode$_C$) | 52 | 53 | 54 | 54 | 55 | 55 | 55 | 56 | 56 | 57 | 57 | 58 | 58 | | | | | |

Here, Luma mode indicates the luma intra-prediction mode and Intra(Mode$_c$) indicates the chroma intra-prediction mode determined by the encoding device. The encoding device can indicate the chroma intra-prediction mode on the basis of a preset table, for example, the mapping relationship of Table 15, without an additional calculation process.

The encoding device generates a chroma prediction sample of the current block on the basis of the chroma intra-prediction mode (S920). In this case, the encoding device may generate the chroma prediction sample using neighboring chroma reconstructed samples of the current block according to the chroma intra-prediction mode.

The encoding device encodes information about the prediction mode of the current block and outputs the information (S930). The information about the prediction mode may include information about the luma intra-prediction mode and information about the chroma intra-prediction mode of the current block. The encoded information may be transother steps may be included, or that one or more steps in the flowchart may be deleted without affecting the scope of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An intra-prediction method performed by a video decoding device, the method comprising:
    acquiring information on a luma prediction mode of a current block and information on a chroma prediction mode of the current block from a bitstream;
    deriving a luma intra-prediction mode of the current block on the basis of the information on the luma prediction mode;
    determining a chroma intra-prediction mode of the current block on the basis of the luma intra-prediction mode and the information on the chroma prediction mode; and
    generating a chroma prediction sample of the current block on the basis of the chroma intra-prediction mode,
    wherein a value of the information on the chroma prediction mode indicates 4,
    the luma intra-prediction mode is one of predefined intra-prediction modes #0 to #34, and
    the chroma intra-prediction mode is determined as an intra-prediction mode having a higher number than the luma intra-prediction mode when the luma intra-prediction mode is one of intra-prediction modes #18 to #25 and determined as an intra-prediction mode having a lower number than the luma intra-prediction mode when the luma intra-prediction mode is one of intra-prediction modes #27 to #34,
    wherein the chroma intra-prediction mode is the same as the luma intra-prediction mode when the luma intra-prediction mode is intra-prediction mode #0 or #1, the chroma intra-prediction mode is determined as an intra-prediction mode having a lower number than the luma intra-prediction mode when the luma intra-prediction mode is one of intra-prediction modes #3 to #9, and the chroma intra-prediction mode is determined as an intra-prediction mode having a higher number than the luma intra-prediction mode when the luma intra-prediction mode is one of intra-prediction modes #11 to #17,
    wherein the chroma intra-prediction mode is determined on the basis of the following equation, $$Intra(Mode_C) = \begin{cases} Mode_Y, & 0 \leq Mode_Y \leq 1 \\ \underset{m \in M}{\mathrm{argmin}}\left\{\left|\dfrac{HAng(Mode_Y) \times}{2 - HAng(m)}\right|\right\}, & 2 \leq Mode_Y \leq 17 \\ \underset{m \in M}{\mathrm{argmin}}\left\{\left|\dfrac{VAng(Mode_Y) \times}{0.5 - VAng(m)}\right|\right\}, & 18 \leq Mode_Y \leq 34 \end{cases}$$

wherein $Intra(Mode_C)$ indicates the chroma intra-prediction mode, $Mode_Y$ indicates the luma intra-prediction mode, M indicates angular prediction modes #2 to #34, HAng(Mode) indicates a horizontal reference angle corresponding to an intra-prediction mode and VAng (Mode) indicates a vertical reference angle corresponding to an intra-prediction mode,
    wherein a horizontal reference angle corresponding to each intra-prediction mode represents a relative angle on the basis of an angle of 0° corresponding to intra-prediction mode #10, and a vertical angle corresponding to each intra-prediction mode represents a relative angle on the basis of angle 0° corresponding to intra-prediction mode #26.

2. The intra-prediction method according to claim 1, wherein, when the luma intra-prediction mode is one of intra-prediction modes #2 to #17, an index value of the chroma intra-prediction mode is limited within an index value of a chroma intra-prediction mode when the luma intra-prediction mode is intra-prediction mode #18.

3. The intra-prediction method according to claim 1, wherein the chroma intra-prediction mode is determined on the basis of the following table,

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |
| | Luma mode | | | | | | | | | | | | | | | | | |
| | 18 | 19 | 20 | 21 | 22 | 23 | 24 | 25 | 26 | 27 | 28 | 29 | 30 | 31 | 32 | 33 | 34 | |
| Intra(Mode$_C$) | 22 | 22 | 23 | 23 | 24 | 24 | 25 | 26 | 26 | 26 | 27 | 28 | 28 | 29 | 29 | 30 | 30 | | wherein Luma mode indicates the luma intra-prediction mode and Intra(Mode$_c$) indicates the chroma intra-prediction mode.

4. The intra-prediction method according to claim 1, wherein the determining of the chroma intra-prediction mode of the current block comprises:
    deriving a temporal chroma intra-prediction mode on the basis of the luma intra-prediction mode and the information on the chroma intra-prediction mode; and
    determining the chroma intra-prediction mode on the basis of the temporal chroma intra-prediction mode,
    wherein the temporal chroma intra-prediction mode is determined on the basis of the following table,

| | IntraPredModeY[xPb][yPb] | | | | |
|---|---|---|---|---|---|
| intra_chroma_pred_mode[xPb][yPb] | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X | wherein IntraPredModeY[xPb] [yPb] indicates a luma intra-prediction mode and intra_chroma_pred_mode [xPb][yPb] indicates information on a chroma intra-prediction mode.

5. The intra-prediction method according to claim 4, wherein the chroma intra-prediction mode is determined on the basis of the following table,

| | modeidx | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |

| | modeidx | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Intra(Mode$_C$) | 22 | 22 | 23 | 23 | 24 | 24 | 25 | 26 | 26 | 26 | 27 | 28 | 28 | 29 | 29 | 30 | 30 | wherein modeIdx indicates the temporal chroma intra-prediction mode and Intra(Mode$_c$) indicates the chroma intra-prediction mode.

6. An intra-prediction method performed by a video decoding device, the method comprising:
acquiring information on a luma prediction mode of a current block and information on a chroma prediction mode of the current block from a bitstream;
deriving a luma intra-prediction mode of the current block on the basis of the information on the luma prediction mode;
determining a chroma intra-prediction mode of the current block on the basis of the luma intra-prediction mode and the information on the chroma prediction mode; and
generating a chroma prediction sample of the current block on the basis of the chroma intra-prediction mode,
wherein a value of the information on the chroma prediction mode indicates 4,
the luma intra-prediction mode is one of predefined intra-prediction modes #0 to #66, and
the chroma intra-prediction mode is determined as an intra-prediction mode having a higher number than the luma intra-prediction mode when the luma intra-prediction mode is one of intra-prediction modes #34 to #49 and determined as an intra-prediction mode having a lower number than the luma intra-prediction mode when the luma intra-prediction mode is one of intra-prediction modes #51 to #66,
wherein the chroma intra-prediction mode is the same as the luma intra-prediction mode when the luma intra-prediction mode is intra-prediction mode #0 or #1, the chroma intra-prediction mode is determined as an intra-prediction mode having a lower number than the luma intra-prediction mode when the luma intra-prediction mode is one of intra-prediction modes #3 to #17, and the chroma intra-prediction mode is determined as an intra-prediction mode having a higher number than the luma intra-prediction mode when the luma intra-prediction mode is one of intra-prediction modes #19 to #33,
wherein the chroma intra-prediction mode is determined on the basis of the following equation, $$Intra(Mode_Y) = \begin{cases} Mode_Y, & 0 \leq Mode_Y \leq 1 \\ \underset{m \in M}{\mathrm{argmin}}\left\{\left|\dfrac{HAng(Mode_Y) \times}{2 - HAng(m)}\right|\right\}, & 2 \leq Mode_Y \leq 33 \\ \underset{m \in M}{\mathrm{argmin}}\left\{\left|\dfrac{VAng(Mode_Y) \times}{0.5 - VAng(m)}\right|\right\}, & 34 \leq Mode_Y \leq 66 \end{cases}$$

wherein Intra(Mode$_c$) indicates the chroma intra-prediction mode, Mode$_Y$ indicates the luma intra-prediction mode, M indicates angular prediction modes #2 to #66, HAng(Mode) indicates a horizontal reference angle corresponding to an intra-prediction mode and VAng(Mode) indicates a vertical reference angle corresponding to an intra-prediction mode,
wherein a horizontal reference angle corresponding to each intra-prediction mode represents a relative angle on the basis of an angle of 0° corresponding to intra-prediction mode #18, and a vertical angle corresponding to each intra-prediction mode represents a relative angle on the basis of angle 0° corresponding to intra-prediction mode #50.

7. The intra-prediction method according to claim 6, wherein the chroma intra-prediction mode is determined on the basis of the following table,

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 2 | 2 | 2 | 2 | 4 | 7 | 9 | 11 | 13 | 14 | 16 |

| | Luma mode | | | | | | | | | | | | | | | | | |
|---|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 | 35 |
| Intra(Mode$_C$) | 18 | 20 | 22 | 23 | 25 | 27 | 29 | 32 | 34 | 36 | 38 | 40 | 42 | 42 | 42 | 42 | 42 | 42 |

-continued

| | Luma mode | | | | | | | | | | | | | | | | | |
|---|---|---|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 | 51 | 52 | 53 |
| Intra(Mode$_C$) | 43 | 43 | 44 | 44 | 45 | 45 | 45 | 46 | 46 | 47 | 48 | 49 | 49 | 50 | 50 | 50 | 51 | 51 |

| | Luma mode | | | | | | | | | | | | | |
|---|---|---|---|---|---|---|---|---|---|---|---|---|---|---|
| | 54 | 55 | 56 | 57 | 58 | 59 | 60 | 61 | 62 | 63 | 64 | 65 | 66 |
| Intra(Mode$_C$) | 52 | 53 | 54 | 54 | 55 | 55 | 55 | 56 | 56 | 57 | 57 | 58 | 58 | wherein Luma mode indicates the luma intra-prediction mode and Intra(Mode$_c$) indicates the chroma intra-prediction mode.

8. An intra-prediction method performed by a video encoding device, the method comprising:
deriving a luma intra-prediction mode of a current block;
determining a chroma intra-prediction mode of the current block;
generating information on the luma intra-prediction mode on the basis of the luma intra-prediction mode and generating information on the chroma intra-prediction mode on the basis of the luma intra-prediction mode and the chroma intra-prediction mode;
generating a chroma prediction sample of the current block on the basis of the chroma intra-prediction mode; and
encoding information on a prediction mode including the information on the luma intra-prediction mode and the information on the chroma intra-prediction mode and outputting the encoded information,
wherein a value of the information on the chroma prediction mode indicates 4,
the luma intra-prediction mode is one of predefined intra-prediction modes #0 to #34, and
the chroma intra-prediction mode is indicated as an intra-prediction mode having a higher number than the luma intra-prediction mode when the luma intra-prediction mode is one of intra-prediction modes #18 to #25 and indicated as an intra-prediction mode having a lower number than the luma intra-prediction mode when the luma intra-prediction mode is one of intra-prediction modes #27 to #34,
wherein the chroma intra-prediction mode is the same as the luma intra-prediction mode when the luma intra-prediction mode is intra-prediction mode #0 or #1, the chroma intra-prediction mode is indicated as an intra-prediction mode having a lower number than the luma intra-prediction mode when the luma intra-prediction mode is one of intra-prediction modes #3 to #9, and the chroma intra-prediction mode is indicated as an intra-prediction mode having a higher number than the luma intra-prediction mode when the luma intra-prediction mode is one of intra-prediction modes #11 to #17,
wherein the chroma intra-prediction mode is determined on the basis of the following equation, $$Intra(Mode_C) = \begin{cases} Mode_Y, & 0 \leq Mode_Y \leq 1 \\ \underset{m \in M}{\operatorname{argmin}}\left\{\left|\frac{HAng(Mode_Y) \times}{2 - HAng(m)}\right|\right\}, & 2 \leq Mode_Y \leq 17 \\ \underset{m \in M}{\operatorname{argmin}}\left\{\left|\frac{VAng(Mode_Y) \times}{0.5 - VAng(m)}\right|\right\}, & 18 \leq Mode_Y \leq 34 \end{cases}$$

wherein Intra(Mode$_c$) indicates the chroma intra-prediction mode, Mode$_Y$ indicates the luma intra-prediction mode, M indicates angular prediction modes #2 to #34, HAng(Mode) indicates a horizontal reference angle corresponding to an intra-prediction mode and VAng (Mode) indicates a vertical reference angle corresponding to an intra-prediction mode,
wherein a horizontal reference angle corresponding to each intra-prediction mode represents a relative angle on the basis of an angle of 0° corresponding to intra-prediction mode #10, and a vertical angle corresponding to each intra-prediction mode represents a relative angle on the basis of angle 0° corresponding to intra-prediction mode #26.

9. The intra-prediction method according to claim 8, wherein the chroma intra-prediction mode is determined on the basis of the following table,

| | Luma mode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Intra(Mode$_C$) | 0 | 1 | 2 | 2 | 2 | 2 | 2 | 4 | 7 | 8 | 10 | 12 | 13 | 16 | 18 | 20 | 22 | 22 |

| | Luma mode | | | | | | | | | | | | | | | | | |
|---|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| Intra(Mode$_C$) | 22 | 22 | 23 | 23 | 24 | 24 | 25 | 26 | 26 | 26 | 27 | 28 | 28 | 29 | 29 | 30 | 30 | wherein Luma mode indicates the luma intra-prediction mode and Intra(Mode$_c$) indicates the chroma intra-prediction mode.

* * * * *